(12) United States Patent
Siomina et al.

(10) Patent No.: US 9,847,855 B2
(45) Date of Patent: Dec. 19, 2017

(54) SYSTEMS AND METHODS FOR MANAGING FEEDBACK IN A WIRELESS NETWORK

(71) Applicant: TELEFONAKTIEBOLAGET L M ERICSSON (PUBL), Stockholm (SE)

(72) Inventors: Iana Siomina, Solna (SE); Shaohua Li, Beijing (CN); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/385,484

(22) PCT Filed: Mar. 16, 2013

(86) PCT No.: PCT/IB2013/052117
§ 371 (c)(1),
(2) Date: Sep. 15, 2014

(87) PCT Pub. No.: WO2013/136316
PCT Pub. Date: Sep. 19, 2013

(65) Prior Publication Data
US 2015/0036580 A1 Feb. 5, 2015

(30) Foreign Application Priority Data

Mar. 16, 2012 (WO) ................ PCT/CN2012/072429

(51) Int. Cl.
*H04L 5/00* (2006.01)
*H04W 4/08* (2009.01)
(Continued)

(52) U.S. Cl.
CPC ............ *H04L 1/189* (2013.01); *H04J 11/005* (2013.01); *H04L 1/1854* (2013.01);
(Continued)

(58) Field of Classification Search
None
See application file for complete search history.

(56) References Cited

U.S. PATENT DOCUMENTS

2010/0097978 A1* 4/2010 Palanki ................ H04L 1/1867
370/315
2012/0147827 A1* 6/2012 Wu ....................... H04L 1/1854
370/329
(Continued)

FOREIGN PATENT DOCUMENTS

WO    WO 2010/048645 A2    4/2010
WO    WO 2011020922 A1    2/2011

OTHER PUBLICATIONS

R4-115130, Further considerations on ABS pattern design, NEC, Zhuhai, Oct. 10-14, 2011.

*Primary Examiner* — Chi H Pham
*Assistant Examiner* — Soon-Dong D Hyun

(57) ABSTRACT

A method of managing inter-cell interference in a wireless communication device includes obtaining information indicating a first set of candidate subframes. Each of the candidate subframe satisfies a candidate condition that relates to transmissions in a second cell during that subframe. The method also includes identifying at least one subframe associated with downlink transmissions to the wireless communication device in a first cell and determining whether the identified subframe is included in the set of candidate subframes. If the identified subframe is included in the set of candidate subframes, the method includes receiving at least one downlink transmission during the identified subframe. If the identified subframe is not included in the set of candidate subframes, the method includes performing one or more of assuming no downlink transmission will occur in the identified subframe, deciding to not receive a downlink transmission in the identified (Continued)

subframe, and assuming a pre-defined result for a downlink transmission associated with the identified subframe.

38 Claims, 12 Drawing Sheets

(51) Int. Cl.
| | | |
|---|---|---|
| *H04W 72/00* | (2009.01) | |
| *H04W 72/04* | (2009.01) | |
| *H04W 72/08* | (2009.01) | |
| *H04L 1/18* | (2006.01) | |
| *H04L 12/18* | (2006.01) | |
| *H04W 24/10* | (2009.01) | |
| *H04W 4/06* | (2009.01) | |
| *H04W 24/02* | (2009.01) | |
| *H04J 11/00* | (2006.01) | |
| *H04L 1/12* | (2006.01) | |

(52) U.S. Cl.
CPC .......... *H04L 1/1887* (2013.01); *H04L 5/0032* (2013.01); *H04L 5/0053* (2013.01); *H04L 5/0055* (2013.01); *H04L 5/0073* (2013.01); *H04L 12/1877* (2013.01); *H04W 4/06* (2013.01); *H04W 4/08* (2013.01); *H04W 24/02* (2013.01); *H04W 24/10* (2013.01); *H04W 72/005* (2013.01); *H04W 72/042* (2013.01); *H04W 72/0413* (2013.01); *H04W 72/082* (2013.01); *H04L 2001/125* (2013.01); *H04W 72/0426* (2013.01)

(56) References Cited

U.S. PATENT DOCUMENTS

| | | | | |
|---|---|---|---|---|
| 2012/0170504 | A1* | 7/2012 | Hoymann | H04B 7/155 370/312 |
| 2013/0077543 | A1* | 3/2013 | Kim | H04B 7/15507 370/281 |
| 2014/0200020 | A1* | 7/2014 | Lindoff | H04L 1/0026 455/452.1 |

\* cited by examiner

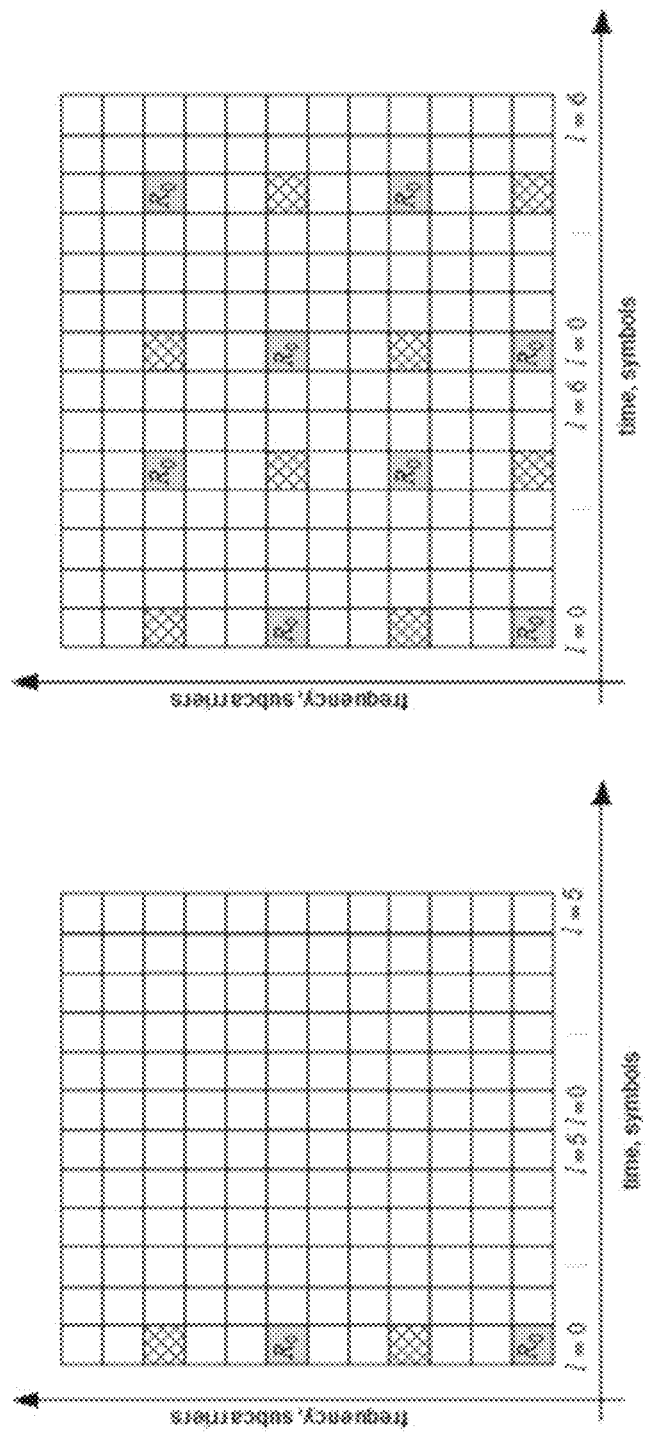

FIGURE 3

SYSTEMS AND METHODS FOR MANAGING FEEDBACK IN A WIRELESS NETWORK

CLAIM OF PRIORITY

The present application claims the benefit of PCT Patent Application Serial No. PCT/CN2012/072429, filed on Mar. 16, 2012, entitled Methods for Reliable Reception of HARQ Feedback Information in Heterogeneous Deployments, the disclosure of which is incorporated herein in its entirety by reference.

TECHNICAL FIELD OF THE INVENTION

This disclosure relates in general to wireless communication and, more particularly, to improving the reliability of wireless transmissions.

BACKGROUND OF THE INVENTION

The dramatic increase in the use and availability of communication services in recent years has placed significantly greater demands on wireless communication networks. Continually increasing requirements for coverage, throughput, and reliability have driven many developments in the design and configuration of wireless networks. One example of this has been the development of "heterogeneous" networks in which conventional macro-cell base stations are supplemented by the deployment of various types of "low-power" nodes that provide lower maximum transmission power levels than conventional macro-cell base stations. These low-power nodes are often smaller and cheaper, both to manufacture and to operate, than conventional macro-cell access nodes.

Heterogeneous deployments provide a mechanism for increasing network densities and for adapting to changes in traffic needs and operating environment. However, heterogeneous deployments bring unique challenges that may hinder efficient network operation and degrade user experience. The reduced transmission power typically associated with low-power nodes can result in an increased sensitivity to interference. Additionally, the mix of large and small cells in a heterogeneous deployment can lead to other challenges, as a result of the asymmetric power capabilities of the different cells. As a result, there is a need for effective solutions to reduce inter-cell interference in heterogeneous deployments and other advanced networks.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method of managing inter-cell interference in a wireless communication device includes obtaining information indicating a first set of candidate subframes. Each of the candidate subframe satisfies a candidate condition that relates to transmissions in a second cell during that subframe. The method also includes identifying at least one subframe associated with downlink transmissions to the wireless communication device in a first cell and determining whether the identified subframe is included in the set of candidate subframes. If the identified subframe is included in the set of candidate subframes, the method includes receiving at least one downlink transmission during the identified subframe. If the identified subframe is not included in the set of candidate subframes, the method includes performing one or more of assuming no downlink transmission will occur in the identified subframe, deciding to not receive a downlink transmission in the identified subframe, and assuming a pre-defined result for a downlink transmission associated with the identified subframe.

Important technical advantages provided by certain embodiments of the present disclosure include improved reliability in wireless communications. Particular embodiments may be capable of reducing inter-cell interference experienced by wireless communication devices, especially in heterogeneous networks. Such embodiments may be capable of reducing the number of erroneous transmissions and/or increasing the likelihood that wireless transmissions will be successfully received. Additionally, in particular embodiments, the reduction in interference can be achieved with minimal impact on the throughput of the interfering cell. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIGS. 2A and 2B illustrate example transmission patterns for a subframe configured as, respectively, a Multicast and Broadcast Single Frequency Network (MBSFN) Almost Blank Subframe (ABS) subframe and a non-MBSFN ABS subframe;

FIG. 3 is a diagram showing, possible MBSFN-configurable subframes according to an example frame configuration;

DETAILED DESCRIPTION OF THE INVENTION

Figure 1A:
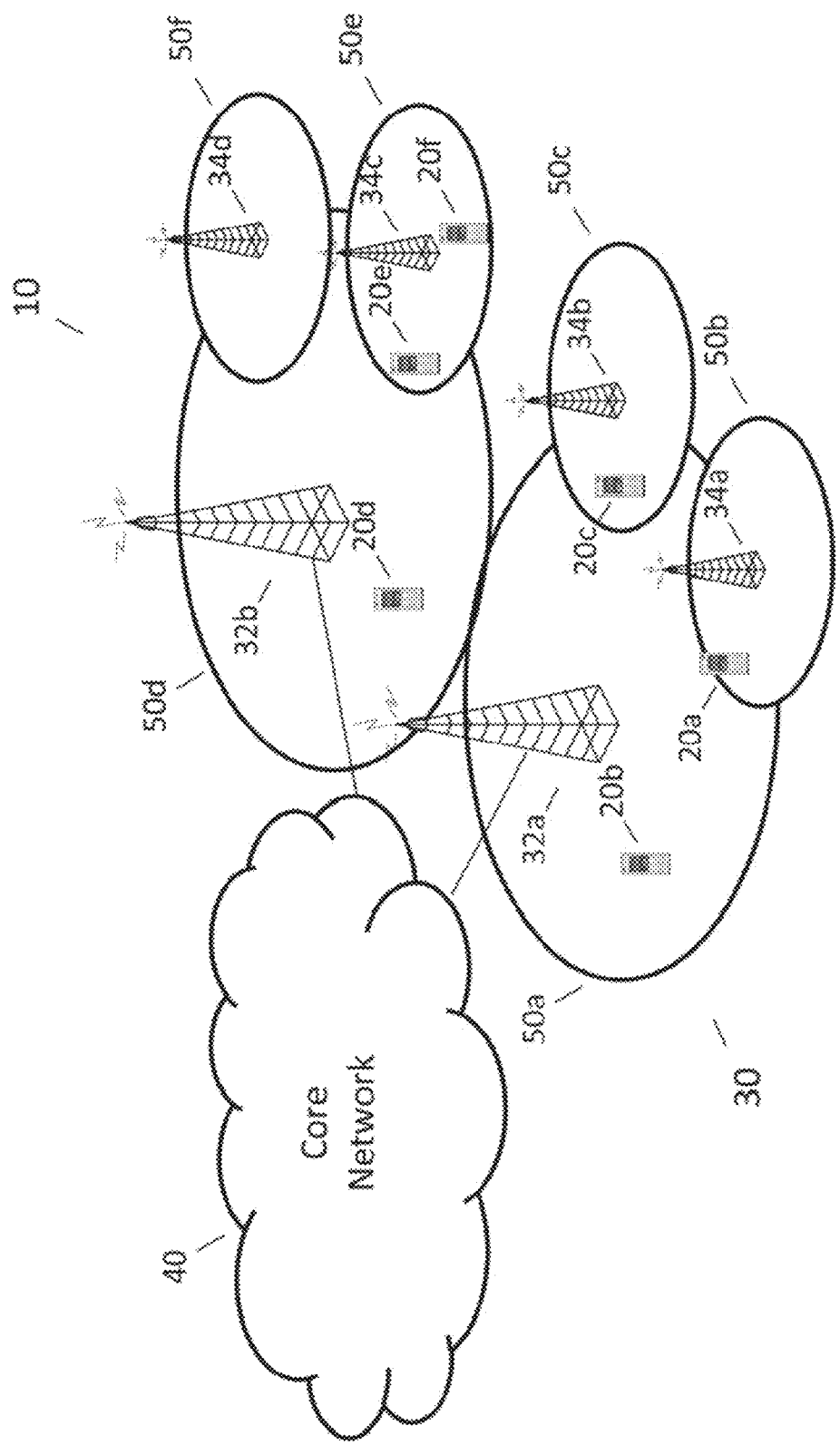
FIGS. 1A-1C illustrate particular embodiments of a wireless communication system in which the described solutions may be implemented.

FIG. 1A illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. Access network 30 includes multiple radio access nodes including, in certain embodiments, multiple different types of radio access nodes (e.g., both base stations 32 and low-power nodes 34). Each radio access node serves one or more cells 50. Because of the close proximity (and potential overlap) of the cells 50, a wireless communication device 20 operating in a first cell 50 (referred to herein as a "victim cell") may suffer interference due to transmissions occurring in a second cell 50 (referred to herein as an "aggressor cell") that is overlapping or near to the victim cell. This aggressor cell may be served by the same radio access node as the victim cell or by a different radio access node.

Additionally, as noted above, access network 30 may represent a heterogeneous network in which radio access nodes transmitting at different power levels are deployed. This may create more severe interference problems, especially when the victim cell is served by a radio access node using a higher power than the radio access node serving the interfering cell—e.g., for FIG. 1A, in situations in which the victim cell is served by one of low-power nodes 34 and the aggressor cell is served by one of base stations 32.

Figure 1B:
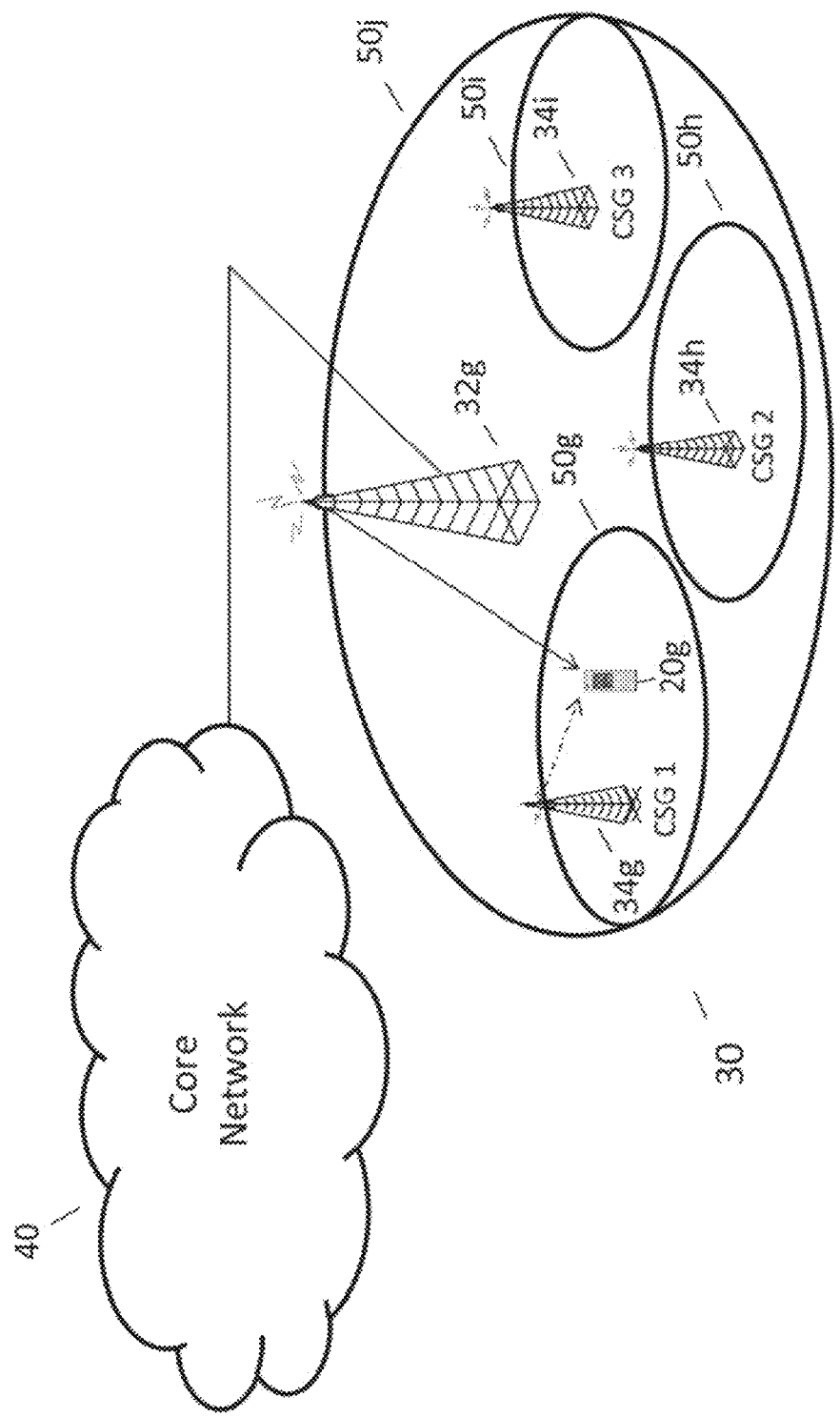

These interference problems may be even further exacerbated by certain solutions that are commonly implemented in heterogeneous networks that utilize certain types of low-power nodes 34. For example, FIG. 1B illustrates problems that may arise in certain embodiments of wireless communication system 10 when one or more low-power nodes 34 are configured to utilize closed subscribed groups (CSGs). In the example of FIG. 1B, one or more low-power nodes 34 are configured to utilize a CSG. The use of CSGs may allow low-power nodes 34 to limit access to their services to certain authorized users that are part of a "closed subscriber group." A radio access node configured with a CSG will provide communication services to wireless communication devices 20 that are members of the CSG, but deny service to wireless communication devices 20 that are not members of that node's CSG. For example, a picocell operated by an employer to provide service for its employees in their workplace could be configured with a CSG that includes the wireless communication devices 20 of all the company's employees. By using the CSG, this low-power node 34 could provide additional or better service coverage to the company's employees beyond that provided by nearby base stations 32 but may still prevent non-employees in the area from tying up the picocell's transmission, reception, or processing resources.

Thus, non-CSG wireless communication devices 20 that are operating in a cell 50 served by a CSG low-power node 34 cannot utilize CSG low-power node 34, even though the CSG low-power node 34 may be the closest radio access node. On the other hand, wireless transmissions made by the CSG low-power node 34 may still interfere with communications between these non-CSG wireless communication devices 20 and other radio access nodes serving them. Moreover, non-CSG wireless communication devices 20 may be located extremely close to the CSG low-power node 34 despite being unable to obtain service from the CSG low-power node 34, which may result in a significant amount of interference for the non-CSG wireless communication devices 20. For instance, in the example shown in FIG. 1B, it is assumed that wireless communication device 20g is not a member of the CSG served by low-power node 34g and cannot obtain service from low-power node 34g. Instead, wireless communication device 20g is served by base station 32g in cell 50j. As a result, cell 34g served by CSG low-power node 34g may act as an aggressor cell while wireless communication device 20 is operating in the portion of cell 50j that overlaps cell 34g. The interference from this aggressor cell 50g may be extremely high wireless communication device 20g is operating very close to low-power node 34g.

Figure 1C:
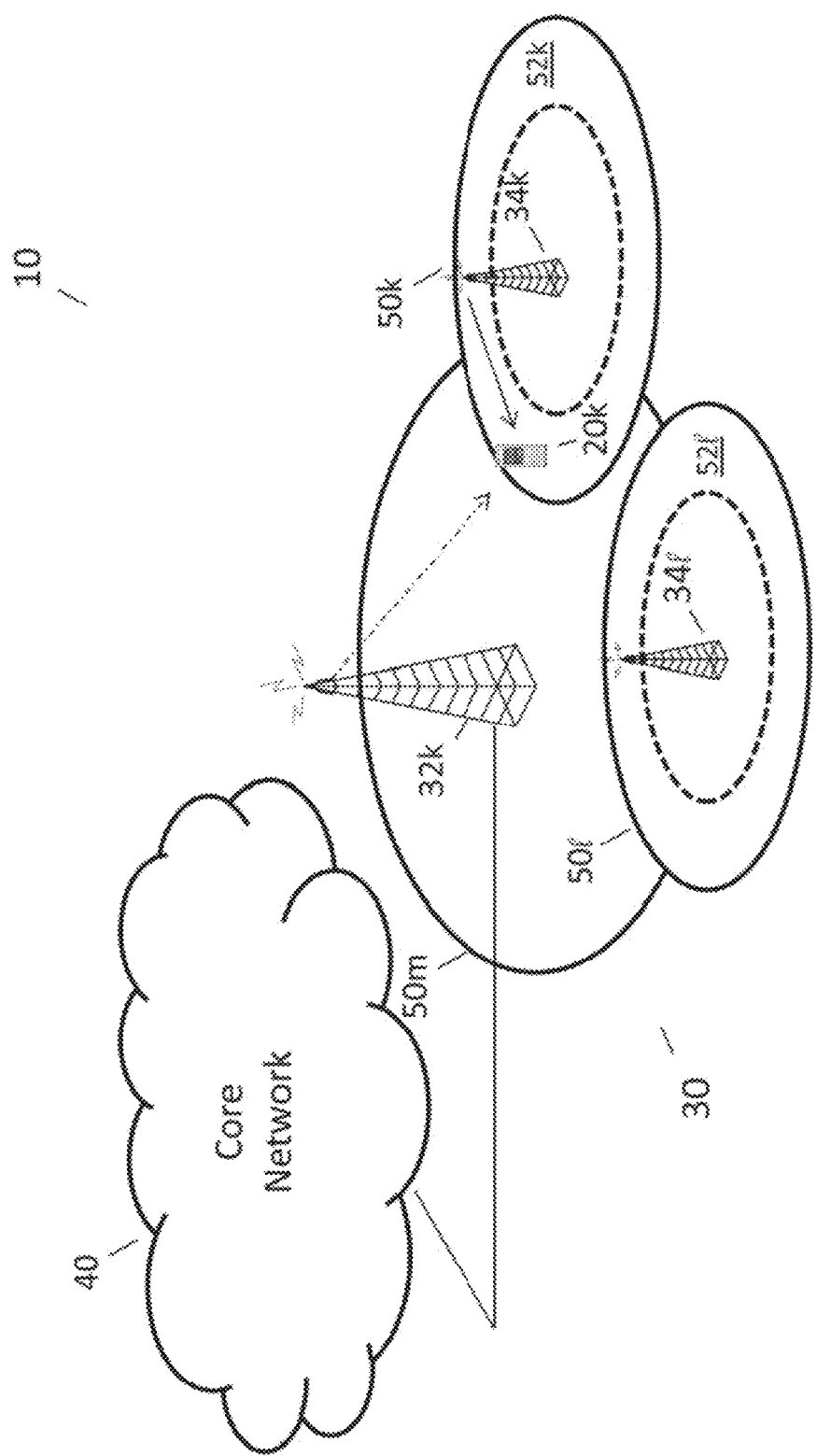

Another interference problem that may arise, especially in heterogeneous networks, relates to the use of "cell range expansion" (or "cell range extension") (CRE) zones. FIG. 1C illustrates an example in which one or more low-power nodes 34 are configured to support CREs. In CREs, cell selection/re-selection diverges from a conventional signal-strength-based (e.g., RSRP-based) approach towards, for example, a pathloss- or pathgain-based approach, thereby extending the coverage of the lower-power cell to include additional areas (represented by CRE zones 52 in FIG. 1C). The larger a particular CRE zone 52 is, the weaker serving cell's signal strength will be near its boundary. This may result in nearby macro cells acting as aggressor cells to wireless communication devices 20 operating in a CRE zone 52. For example, in FIG. 1C, cell 50m served by base station 32k may act as an aggressor cell for wireless communication device 20k operating in CRE zone 52k of low-power node 34k. Thus, in general, as shown by FIGS. 1A-1C inter-cell interference can be a significant concern in wireless communication systems, particularly in those implementing heterogeneous deployments.

It may be critical to protect certain types of signaling from such inter-cell interference. For example, certain embodiments of wireless communication system 10, such as those supporting Long-Term Evolution (LTE), may utilize Hybrid-Automatic Repeat reQuest (HARQ) functionalities for transmission error correction. In particular embodiments, HARQ functionality provides an N-process Stop-And-Wait mechanism that transmits and retransmits transport blocks. Upon reception of a transport block, the receiver makes an attempt to decode the transport block and informs the transmitter about the outcome of the decoding operation by transmitting feedback information (e.g., a single-bit acknowledgement (ACK) for successful reception or negative acknowledgement (NAK) for unsuccessful reception) indicating whether the decoding was successful and/or whether a retransmission of the transport block is required. If interference from an aggressor cell prevents feedback information of this type from being successfully transmitted, a significant number of unnecessary retransmissions may occur and/or erroneously received transmissions may never be retransmitted.

Additionally, HARQ may also be used for contention-based random access transmissions, both for a first scheduled uplink transmission (e.g., for initial access, after handover, or upon RRC connection reestablishment) and for contention resolution in downlink (where HARQ feedback is transmitted only by the wireless communication device 20 which detects its own identity, as provided in message 3, echoed in a Contention Resolution message). HARQ failure in the first uplink transmission step or in the contention resolution step may result, for example, in a cell radio network temporary identity (C-RNTI) detection failure by the relevant wireless communication device 20 or erroneous assignment of the same C-RNTI also to another wireless communication device 20.

Figure 4:
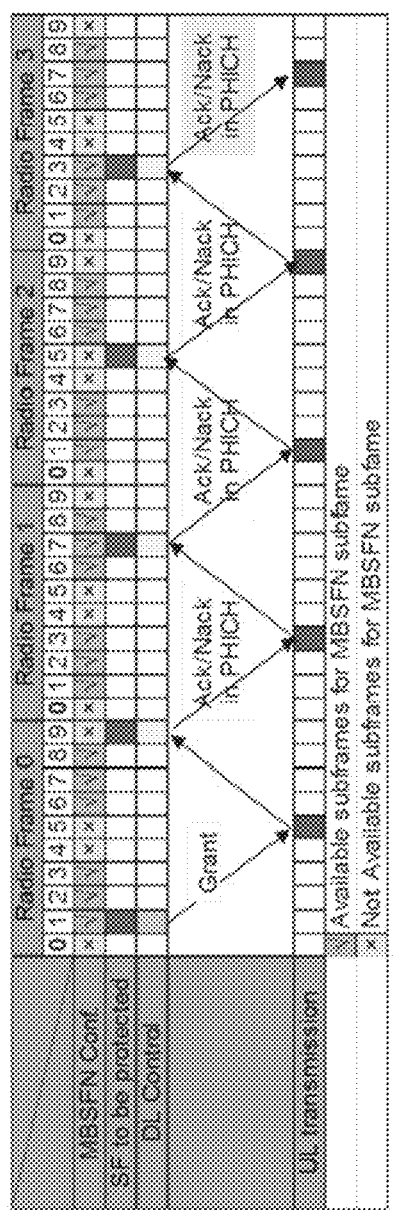
FIG. 4 illustrates timing for Hybrid-Automatic Repeat reQuest (HARQ) signaling according to an example HARQ scheme.

Certain embodiments of wireless communication system 10 utilize "synchronous HARQ" for some or all of their transmissions. For example, LTE implementations use synchronous HARQ for uplink user data transmissions on the Uplink Shared CHannel (UL-SCH), providing HARQ feedback information in the downlink on a Physical Hybrid-ARQ Indicator CHannel (PHICH). Synchronous HARQ involves synchronous HARQ feedback and synchronous retransmissions. In such embodiments, the time instants for downlink transmissions of feedback information and any uplink retransmissions are fixed based on the subframe(s) scheduled for the uplink transmissions and known to both the radio access node and the relevant wireless communication device 20. Consequently, there may not be any need to signal a HARQ process number when operating in this HARQ mode. The maximum number of retransmissions may be configured per wireless communication device 20. An example of synchronous HARQ operation is shown in FIG. 4.

In particular embodiments of wireless communication system 10, transmissions in aggressor cells may be constrained by predetermined transmission patterns that limit downlink transmissions made by the radio access nodes serving those cells. These transmission patterns may limit the time and/or frequency resources that are used for making downlink transmissions in the relevant cell. As it result, these transmission patterns may provide a victim cell protection from interference by an aggressor cell in other time and/or frequency resources.

For example, wireless communication system 10 may configure radio access nodes to utilize Almost Blank Subframe (ABS) patterns that result in these radio access nodes transmitting a minimal amount of signaling during certain subframes. In particular embodiments, ABS patterns define low-power and/or low-transmission activity subframes (e.g., subframes in which a reduced number of modulation symbols are transmitted or some other reduction in the amount of data or signaling occurs) for the relevant cell 50. For example, an ABS pattern for a potential aggressor cell may specify a number of subframes during which no user data is transmitted in the aggressor cell, although control channel information may still be transmitted during the relevant subframes. In particular embodiments, ABS patterns may be exchanged between radio access nodes (e.g., via an X2 interface).

Furthermore, in particular embodiments, the inter-cell interference caused by an aggressor cell may be significantly reduced during those ABS subframes that are also configured as Multicast and Broadcast Single Frequency Network (MBSFN) subframes. In certain embodiments, MBSFN subframes are divided into a non-MBSFN region and an MBSFN region. For example, the non-MBSFN region may span the first one or two orthogonal frequency division multiplexing (OFDM) symbols in an MBSFN subframe with the length of the non-MBSFN region being 1 or 2 symbols (e.g., one symbol may be used with 1 or 2 cell-specific ports when the number of resource blocks exceeds 10). In such embodiments, the MBSFN region in an MBSFN subframe may then be defined as the OFDM symbols that do not make up part of the non-MBSFN region. While some MBSFN subframes may carry multicast transmissions, such as Physical Multicast Channel (PMCH) transmission, not all MBSFN subframes include such transmissions, despite their name. MBSFN subframes without multicast transmissions are referred to herein as "blank MBSFN subframes." Nonetheless, even in blank MBSFN subframes, certain types of signaling may still be transmitted in part of the non-MBSFN region. For example, in LTE networks, common reference signals (CRS) any still be transmitted in the non-MBSFN region of the of blank MBSFN subframes, namely in the first symbol. However, unlike ABS configured in non-MBSFN subframes (a "non-MBSFN ABS configuration"), ABS configured in blank MBSFN subframes (an "MBSFN ABS configuration") may result in less inter-cell interference due to the fact that certain information (e.g., CRS in LTE networks) is not transmitted in the MBSFN region of MBSFN subframes. A subframe diagram for an example MBSFN ABS configuration that may be used in particular embodiments of wireless communication system 10 is schematically illustrated in FIG. 2A, while a subframe diagram for an example non-MBSFN ABS configuration that may be used in particular embodiments is schematically illustrated in FIG. 2B. In the examples of FIGS. 2A and 2B, it is assumed that two transmit antenna ports are used for CRS with transmissions shown for the first port (marked with "R0") and the second port (marked with crosshatching). As can be seen from FIGS. 2A and 2B, when a potential aggressor cell is configured with MBSFN ABS, transmissions will occur in fewer symbols per subframe than with non-MBSFN ABS, resulting in less overall interference from an aggressor cell configured with MBSFN ABS.

Figure 3:
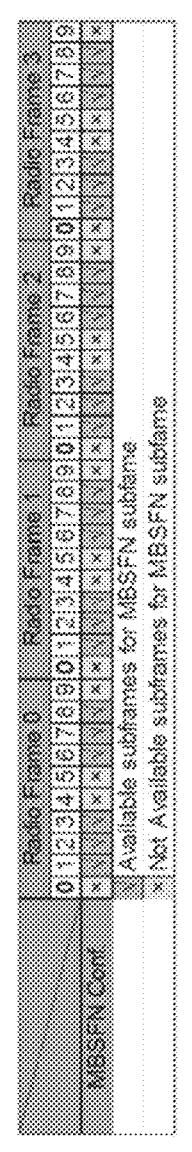

However, not all downlink (DL) subframes may be MBSFN-configurable. FIG. 3 shows an example of how MBSFN configuration is constrained under the 3GPP TS 36.331 specification for Long Term Evolution (LTE) networks when Frequency Division Duplex (FDD) is utilized. As shown in FIG. 3, MBSFN cannot be configured in subframes #1, #5, #9 in an FDD system, since some system information may need to be transmitted in these subframes. Thus, in such embodiments, only subframes #1, #2, #3, #6, #7, and #8 can be configured as MBSFN subframes. By contrast to the FDD constraints shown in FIG. 3, in Time Division Duplex (TDD) LTE systems, only subframes #3, #4, #7, #8, and #9 can be configured for MBSFN. While it might be possible to use a mixture of MBSFN and non-MBSFN ABS to protect more subframes, mixing MBSFN and non-MBSFN ABS subframes can produce other problems, such as inaccurate cell state information reports, less efficient demodulation algorithms for wireless communication devices 20 with advanced receivers, unnecessary constraints on network configuration, and reduced throughput in the aggressor cell. Additionally, some of the available MBSFN subframes may need to be used for purposes other than interference cancellation. Thus, wireless communication system 10 may not have enough MBSFN cells available for ABS to protect all the downlink subframes in the victim cell that it is necessary or desirable to protect. This means that MBSFN subframes can only be used to reduce interference at certain times and, in particular embodiments, the time periods that can be protected may change from network to network.

Figure 5A:
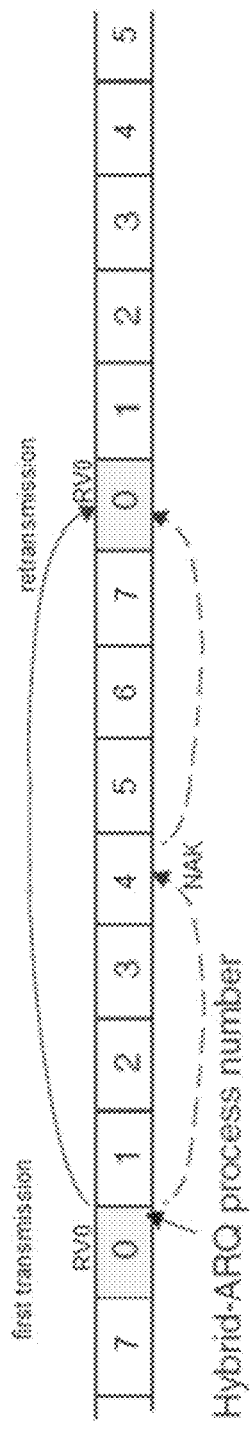
FIG. 5 illustrates the timing of HARQ signaling under the example HARQ scheme relative to that of an example Almost Blank. Subframes (ABS) pattern that may be used to protect downlink transmissions.
Figure 5B:
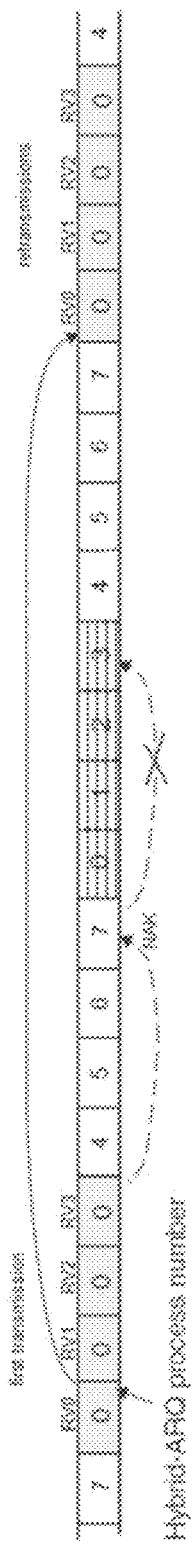

Thus, constraints on how aggressor cell transmission patterns can be configured may make it impossible to protect all the necessary transmission resources in the victim cell from interference using a transmission pattern such as an MBSFN ABS pattern. For example, assume the HARQ timing in a particular embodiment of wireless communication system 10 is based on an 8 ms periodicity, which is consistent with the HARQ periodicity set for LTE. If an uplink grant is first allocated in subframe n, HARQ feedback information (e.g., an ACK/NAK indication) will be sent on the PHICH channel of subframes (n+8k) mod(10), where k is any positive integer value and mod(.) is the modulus after division. When n is an odd number, Subframes 1, 9, 7, 5, and 3 will have ACK/NAK information for the corresponding HARQ process. In this case, although Subframe 9 and 5 would need protection, these subframes would not MBSFN-configurable in the example illustrated by FIG. 3. When n is an even number, downlink HARQ feedback information will be transmitted in Subframes 0, 8, 6, 4, and 2 for the corresponding HARQ process. In this case, Subframes 0 and 4 need protection, but are not MBSFN-configurable either under the example of FIG. 3. To illustrate how this may cause problems, FIG. 4 illustrates timing for a HARQ signaling sequence under an example synchronous HARQ scheme, while FIG. 5 shows the timing of HARQ signaling under the example synchronous HARQ scheme relative to that of an example Almost Blank Subframes (ABS) pattern. In the example synchronous HARQ scheme, the timing relationship between the uplink data transmission and the downlink feedback transmission and/or any possible retransmissions may be fixed. For instance, in the example shown in FIG. 4, a wireless communication device 20 transmits an uplink data transmission during a particular subframe and the radio access node serving this wireless communication device 20 transmits a responsive HARQ feedback transmission a fixed number of subframes after the uplink transmission. In the illustrated example, the HARQ feedback transmission is made 4 subframes after the corresponding uplink transmission, and the HARQ round trip time (RTT) is 8 subframes. Because the MBSFN ABS configuration used in an aggressor cell may not match an 8 subframe periodicity (as shown, for example, by FIG. 3), the subframes during, which a responsive downlink transmission might occur could include subframes that are unprotected, or that receive less protection, by the ABS configuration of an aggressor cell.

An example of such a scenario is shown in FIG. 5. In particular, FIG. 5 shows an example of the timing relationship between the synchronous HARQ signaling that may occur in the victim cell and the ABS configuration in the aggressor cell. As FIG. 5 illustrates, problems may arise if a fixed timing relationship between the uplink transmission and its related downlink transmission is maintained. It may be necessary to protect the PHICH transmission in the victim cell by configuring MBSFN ABS subframes in the aggressor cell or via, some other mechanism if a wireless communication device 20 in the victim cell is going to have an chance of successfully receiving and decoding the PHICH transmissions. In the example of FIG. 5, the subframes in a victim cell that require or would significantly benefit from protection by MBSFN ABS subframes' in the aggressor cell are shown in the row labeled "SF to be protected," As indicated by FIG. 5, under this example configuration. Subframe 9 of Radio Frame 0 and Subframe 5 of Radio Frame 2 cannot be protected with MBSFN ABS subframe, since MBSFN cannot be configured in these subframes in this example. Consequently, only some of the resulting PHICH transmissions can be protected by MBSFN ABS subframes, and without more, some PHICH transmissions will not be detected reliably due to the configuration constraints for MBSFN subframes and the fixed timing relationship between the uplink transmission and the responsive HARQ transmission.

This is an example of a more generic problem that may occur in particular embodiments as a result of a mismatch in the periodicity of the relevant downlink transmissions (e.g., HARQ feedback information transmitted on PHCIH) and that of a transmission pattern (e.g., MBSFN ABS pattern) that provides appropriate interference conditions to protect downlink transmissions in the victim cell. While it may be possible to protect some of the downlink transmissions in a victim cell by simply taking advantage of a transmission pattern configured for the aggressor cell (e.g., an MBSFN ABS pattern), it may not be possible to protect all downlink transmissions made in the victim cell in this manner because of the fixed timing relationship between the uplink transmissions and the corresponding downlink transmissions. In general, when there is a restriction (e.g., due to subframe type such as MBSFN/non-MBSFN, cyclic prefix configuration, interference conditions, network configuration, device activity state) on the time and/or frequency resources that can be protected from interference by the aggressor cell and at the same time there are predetermined time occasions when certain downlink transmissions need to occur in the victim cell (e.g., due to the timing, constraints of synchronous HARQ), these predetermined time occasions may not fully encompass all of the subframes that could possibly be needed for downlink transmissions. Therefore, in embodiments of wireless communication system 10 that exhibit a periodicity mismatch between a pattern of subframes that can be interference-protected and the downlink transmissions that require such protection, it may be impossible to protect all downlink transmissions needing protection without additional measures being taken.

As a result, wireless communication devices 20 and the radio access nodes of particular embodiments of wireless communication system 10 (e.g., base stations 32 and low-power nodes 34) may be configured to implement certain pre-defined behavior when interference from an aggressor cell prevents or is expected to prevent successful transmission of particular types of downlink transmissions in a victim cell. As explained in greater detail below, for a wireless communication device 20 intended to receive the downlink transmission, this behavior may include assuming the downlink transmission was not made during a scheduled subframe, deciding not to attempt to receive the downlink transmission utilizing predetermined information in place of information carried by the downlink transmission, or any combination of these options. By using this pre-defined behavior in place of the conventional procedure for receiving the relevant downlink transmissions, a wireless communication device 20 may be able to limit unnecessary use of its processing and power resources, reduce reliance on information that is likely to be erroneous, and/or provide effective fallback mechanisms for operating without information that is unlikely to be successfully received.

As also explained in greater detail below, for a radio access node intended to transmit the downlink transmission, the pre-defined behavior may include refraining from making the downlink transmission, assuming the target wireless communication device 20 will utilize predetermined information in place of the information to be carried by the downlink transmission, or a combination of these options. By using this pre-defined behavior, the radio access node can limit unnecessary use of its own processing and power resources, free transmission resources in the victim cell for other uses, and correctly anticipate how the wireless communication device 20 will respond in a situation in which successful receipt of the downlink transmission is unlikely. Thus, particular embodiments of wireless communication device 20 may provide an effective solution for dealing with inter-cell interference, including in many situations in which ABS-based interference protection would be ineffective or impossible.

Returning now to the example embodiment shown in FIG. 1A, the illustrated embodiment of wireless communication system 10 provides wireless communication service to one or more wireless communication devices 20 operating within a plurality of cells 50 served by wireless communication system 10. Wireless communication system 10 may support communication of any suitable type and/or in accordance with an appropriate communication standards including, but not limited to, any Long Term Evolution (LTE), Worldwide interoperability for Microwave Access (Wi-MAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine-type communication (MTC). For example, wireless communication device 20 may represent a wireless meter or sensor, a digital billboard, a wireless-capable appliance (e.g., a washing machine, furnace, digital video recorder (DVR)), or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. Access network 30 includes one or more radio access nodes capable of communicating wirelessly with wireless communication devices 20. In the example embodiment of FIG. 1A, these radio access nodes include a plurality of base stations 32 and low-power nodes 34. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40.

In particular embodiments, access network 30 may represent a heterogeneous network in which multiple different types of radio access nodes are deployed. For example, in the illustrated example of FIG. 1A, access network 30 includes a plurality of base stations 32 that each serve one or more cells 50 and a plurality of low-power nodes 34 that each serve one or more cells. For purposes of this description, cells 50 served by base stations 32 are referred to as "macro" cells, while cells 50 served by low-power stations 34 are referred to as "micro" cells. In particular embodiments, micro-cells served by low-power stations 34 may substantially overlap one or more macro-cells served by nearby base stations 32, as shown in FIG. 1A. Base stations 32 communicate wirelessly with wireless communication devices 20 to facilitate wireless communication service for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), or any other suitable element capable of communicating with wireless communication devices 20 wirelessly.

Similarly, low-power nodes 34 communicate wirelessly with wireless communication devices 20 to facilitate wireless communication service for wireless communication devices 20. Low-power nodes 34 may also include any appropriate elements to communicate with wireless communication devices 20 and to interface wireless communication devices 20 with core network 40. In particular embodiments, low-power nodes 34 may have a lower maximum transmission power than base stations 32, or may be configured to use lower transmission powers than base stations 32. Examples of low-power nodes 34 include, but are not limited to, pica base stations, femto base stations, micro base stations, home eNodeBs (HeNBs), and wireless local access network (WEAN) access points.

Although referred to as being "low-power," low-power nodes 34 may, in particular embodiments, include identical physical components to base stations 32 but, at a given time, may be simply configured to operate differently from base stations 32. Furthermore, although the description below focuses, for purposes of example, on embodiments in which access network includes radio access nodes that differ in terms of transmission power, other embodiments of access network 30 may include differing types of radio access nodes that differ in regards to other aspects of their operations and/or other capabilities or characteristics. Moreover, alternative embodiments of access network 30 may represent homogeneous networks in which all of the radio access nodes are similar or identical.

Each radio access node in access network 30 is associated with one or more cells 50 that is served by that radio access node. Cells 50 may define an approximate geographical area served by the corresponding radio access node. For purposes of simplicity, FIG. 1A illustrates an example embodiment in which each radio access node is configured to serve a single cell 50. However, in particular embodiments, the radio access nodes may be capable of supporting multiple different cells 50. For example, in embodiments that support carrier aggregation or other multicarrier features, a particular radio access node may serve multiple different cells 50, possibly with identical geographic coverage, with each of the cells 50 served by that radio access node using a carrier from a different portion of the frequency spectrum. As a result, in particular embodiments, a first cell 50 and a second cell 50 may both be served by the same radio access node, and those cells 50 may cover identical, overlapping, or completely distinct geographical areas.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20. In operation, radio access nodes of wireless communication system 10 (such as base stations 32 and low-power nodes 34 in the example embodiment) provide wireless communication service to wireless communication devices 20 operating in the cells 50 served by these radio access nodes. FIG. 1A shows an example in which a victim cell served by a first radio access node (here, cell 50b served by low-power node 34a) experiences interference from transmissions made by a second radio access node serving an aggressor cell (here, base station 32a serving cell 50a).

In this example, it is assumed that base station 32a is configured with an ABS configuration or another type of transmission pattern that protects a first group of subframes in the victim cell (e.g., by limiting or preventing transmissions by base station 32a). This first group of subframes includes some but not all of the subframes available in the radio frame used by low-power node 34a. In particular embodiments, wireless communication device 20a may also be configured with a restricted measurement pattern that is generated or selected based on the ABS configuration of base station 32a.

While ABS configurations can effectively limit inter-cell interference in their protected subframes, it is often not possible to ABS configurations, particularly MBSFN ABS configurations, to protect all the subframes in which critical downlink transmissions may occur. Because the ABS configuration used by base station 32a in this example does not protect all of the subframes in the victim cell, some subframes will still be unprotected from interference by the aggressor cell. In certain scenarios, the interference experienced in the victim cell during the unprotected subframes may be substantial—substantial enough in some cases that successful reception of certain types of downlink transmissions by wireless communication device 20a may be unlikely during, any of the unprotected subframes.

To further limit the impact of interference, wireless communication devices 20 operating in potential victim cells may be configured with restricted measurement patterns that limit the subframes in which those wireless communication devices 20 perform measurements and possibly the subframes in which the perform or attempt to perform other operations. While these patterns can prevent wireless communication devices 20 from attempting measurements and other interference-sensitive operations, restricted measurement patterns cannot themselves prevent inter-cell interference by an aggressor cell. As a result, restricted measurement cells are often used in conjunction with transmission patterns, such as MBSFN ABS configurations, to configure wireless communication devices 20 to use the protected subframes created by such transmission patterns.

In particular embodiments, the restricted measurement patterns used for wireless communication devices 20 in a victim cell are generated or selected based on the ABS configuration of a potential aggressor cell for the victim cell. In such embodiments, the restricted, measurement patterns may limit wireless communication devices 20 to performing certain operations (e.g., measurements) only in the subframes protected by the ABS configuration of the aggressor cell or to a subset of those subframes. Nonetheless, despite the use of ABS configurations in the aggressor cell and restricted measurement patterns in the victim cell, one or more subframes in the victim cell may still receive limited or no interference protection from the aggressor cell. Thus, erroneous reception of downlink transmissions in the victim cell during those subframes may still be possible, and in some cases, very likely.

To alleviate problems that ma be caused by these failed downlink transmissions, particular embodiments of wireless communication system 10 may implement certain pre-defined behavior in regards to downlink transmissions occurring during subframes that are not among a first group of "candidate" subframes in which interference from the aggressor cell is not significant enough to make successful downlink transmissions unlikely. In particular embodiments, these candidate subframes may represent subframes in which transmissions by base station 32a in the aggressor cell are limited in some way (e.g., the subframes configured as ABS subframes under the ABS configuration), subframes in which low-power node 34a or access network 30 has designated as being acceptable for certain or all interference sensitive operations (e.g., the subframes identified by a restricted measurement pattern configured for wireless communication device 20a), or some combination of the two. For the purposes of this example, it is assumed that the relevant candidate subframes includes all of the ABS subframes in the ABS configuration for base station 32a and that the restricted measurement pattern represents a subset of these subframes, meaning all of the subframes identified by the configured restricted measurement pattern are also candidate subframes. Alternatively, in some embodiments, the candidate subframes may depend on an ability of the wireless communication device 20 to handle high-interference associated with transmissions in the aggressor cell and/or a receiver type for a receiver of wireless communication device 20 (e.g., an indication of its ability to handle or mitigate certain types of interference). More generally, the candidate subframes may represent any subframes that satisfy a candidate condition that relates in any suitable manner to transmissions in an aggressor cell during the relevant subframes. Wireless communication device 20a may implement certain pre-defined behavior in regards to a downlink transmission during subframes that are not part of a first group of candidate subframes. For instance, low-power node 34a may be configured to make certain downlink, transmissions in accordance with some fixed timing constraint. For example, in embodiments that implement the example synchronous HARQ feedback scheme described in FIG. 5, a responsive downlink feedback transmission must be made 4 subframes after the corresponding uplink transmission. If the fixed timing constraint forces the downlink transmission to occur during a subframe that is not one of the candidate subframes, this may trigger certain pre-defined behavior in wireless communication device 20a.

As one example, for a downlink transmission that is scheduled to occur (e.g., as a result of an affirmative scheduling of the transmission, as a result of a timing constraint that governs when the transmission must occur) during a subframe that is not one of the candidate subframes, wireless communication device 20a may assume that the relevant downlink transmission will not occur. For example, returning to the synchronous HARQ example with the four subframe timing constraint, if wireless communication device 20a is scheduled to transmit an uplink data transmission four subframes before a subframe that is not a candidate subframe, wireless communication device 20a may assume that the downlink feedback transmission that is responsive to that uplink data transmission will not be transmitted. By assuming that the transmission will not be made, wireless communication device 20a may save power and processing resources. Wireless communication device 20a could then follow a standard procedure, if one exists for the relevant downlink transmission, for responding to erroneous receptions of the relevant downlink transmission. For example, wireless communication device 20a may receive the transmission in a next possible reception occasion.

As another example, for a downlink transmission that is scheduled to occur during a subframe that is not a candidate subframe wireless communication device 20a may decide not to receive the relevant downlink transmission. In particular embodiments, wireless communication device 20a may not be able to exercise any control over whether the signal associated with the transmission strikes its antenna. However, for purposes of this description, "deciding not to receive" the signal may involve deciding not to activate a receiver circuit, deciding to discard the incident signal after it arrives at wireless communication device 20a, deciding not to decode the signal, deciding not to demodulate the signal, and/or deciding not to perform any additional processing or operation that is normally performed by wireless communication device 20a as part of receiving a signal. By deciding not to receive the downlink transmission, wireless communication device 20a may save power and processing resources that would most likely be wasted attempting to receive the downlink transmission.

As yet another example, for a downlink transmission that is scheduled to occur during a subframe that is not a candidate subframe, wireless communication device 20 could assume a predetermined value for the information communicated by the downlink transmission. For example, returning again to the synchronous HARQ example, if a downlink feedback transmission responsive to an uplink data transmission made by wireless communication device 20a is supposed to occur during a subframe that is not a candidate subframe, wireless communication device 20a could assume a predetermined result for the value of the feedback information transmitted rather than attempting to make any use of actual downlink transmission. For instance, wireless communication device 20 could assume that downlink feedback transmissions that do not occur during a candidate subframe always carry a value of "ACK" or otherwise indicate successful reception of the corresponding uplink data transmission. By assuming a predetermined result, wireless communication device 20a may once again save processing and power resources. Additionally, wireless communication device 20 may provide more predictable results than if attempted to decode the signal received during the unprotected subframe.

If wireless communication device 20 is configured to use pre-defined behavior in handling the relevant downlink transmissions when they do not occur during candidate subframes, its serving radio access node in the victim cell (e.g., low-power node 34a here) may likewise be configured to implement certain pre-defined behavior to minimize the effect of the aggressor interference.

As one example, when a downlink transmission or a particular type of downlink transmission by low-power node 34a is scheduled to occur during a subframe that is not a candidate subframe, low-power node 34a may decide not to transmit the relevant downlink transmission. Alternatively, in other embodiments, low-power node 34a ma decide not to transmit the relevant downlink transmission when the transmission would occur during, a subframe that is not protected by the ABS configuration of the aggressor cell, when the transmission would occur during a subframe that is not part of the restricted measurement pattern configured for wireless communication device 20a or, in general, when wireless communication device 20a is not expected to receive the relevant downlink transmission. Because the chances of wireless communication device 20a successfully receiving the transmission ma be limited in these scenarios, there is little to lose by refraining from making the downlink transmission. Furthermore, if wireless communication device 20a is configured to effectively use pre-defined behavior of its own in such a scenario, the downside to refraining from the transmission is even less. On the other hand, deciding not to transmit the downlink transmission may save processing and power resources for base station 32a and free transmission resources within the victim cell for other uses.

As another example, when a downlink transmission or a particular type of downlink transmission by low-power node 34a is scheduled during a subframe that is not a candidate subframe, low-power node 34a may make the same "assumption" as wireless communication device 20a in regards to what information is communicated. Despite knowing, the value or the content of the information that was or would have been transmitted in the relevant downlink transmission, low-power node 34a may substitute, for the value low-power node 34 actually transmitted or would have transmitted, the same predetermined information that wireless communication device 20a assumed was transmitted. By following the same rules as wireless communication device 20 for determining, the appropriate assumed value, low-power node 34a can arrive at the same predetermined assumption as wireless communication device 20a. Low-power node 34a may then proceed with its operation as if the assumed value had been the value low-power node 34a actually transmitted. This may allow low-power node 34a to better anticipate subsequent operation of wireless communication device 20 then if the assumption were only made at the wireless communication device's side. Thus, if low-power node 34a transmits a downlink feedback transmission that indicates a value of "ACK" but wireless communication device 20a assumes that a "NAK" value was transmitted, low-power node 34a may know not to wait for a retransmission that it might have otherwise expected.

In certain embodiments, the pre-defined behavior may be implemented by either or both of wireless communication device 20a and low-power node 34a unconditionally for all downlink transmissions that are not made during a candidate subframe. However, in other embodiments, the pre-defined behavior may be implemented only if a particular triggering condition or conditions is satisfied.

For instance, in particular embodiments, wireless communication device 20a and/or low-power node 34a determine whether interference conditions warrant applying the techniques described above before doing so. As one example, wireless communication device 20a and low-power node 34a may be configured to utilize the above techniques only when the actual interference in the victim cell is determined to be sufficiently great. Thus, in particular embodiments, the triggering condition may relate to interference measurements performed by wireless communication device 20a, low-power node 34a, or other elements of wireless communication system 10. These interference measurements may represent signal or channel quality estimates, signal strength measurements, channel estimate reports, or any other suitable measurements of interference and/or signal quality in the victim cell. In such embodiments, the radio access node may determine based on one or more interference measurements whether or not to implement the pre-defined behavior.

As another example, wireless communication device 20a may be configured to implement the pre-defined behavior only after detecting the aggressor cell or receiving an indication from access network 30 that a potential aggressor cell exists or that high interference conditions are expected (e.g., through the receipt of a restricted measurement pattern from low-power node 34a). Thus, in such embodiments, the triggering condition may relate to the existence of nearby aggressor cells. Similarly, wireless communication system 10 may use the pre-defined behavior to reduce the impact of CSG radio access nodes on non-CSG wireless communication deices 20 or the impact of operating in a CRE zone of a low-power node 34. Thus, in such embodiments, the triggering condition may relate to whether wireless communication device 20a is operating in a CSG cell for a closed, subscriber group it does not belong to or to whether wireless communication device 20a is operating in a CRE zone 52 of low-power node 34a.

Other possible triggering conditions include, but are not limited to, whether the receive occasions for the relevant downlink transmissions occur at particular times in a subframe whether the system or measurement bandwidths or bandwidth of certain types of signals are below a threshold, and whether the maximum number of retransmissions exceeds a threshold. More generally, however, in particular embodiments of wireless communication system 10, wireless communication device 20a and/or low-power node 34a may be configured to implement the predetermined behavior upon consideration of any suitable triggering conditions or conditions, particular In particular embodiments, the triggering condition may relate, to whether or not higher-layer signaling has provided an indication of the predetermined value to be assumed if a downlink transmission is made in a non-candidate subframe.

In addition, particular embodiments of wireless communication system 10 may be configured to transmit information similar to that transmitted via the downlink transmission in question but on a different protocol layer. For example, in particular embodiments, the downlink transmission itself represents a downlink feedback transmission (e.g., a HARQ feedback transmission) that is performed on a physical layer, and low-power node 34a may transmit information on a different layer (e.g., a higher layer) to supplement or replace the downlink transmission. Wireless communication system 10 may use this technique in conjunction with the pre-defined behavior solutions described above (e.g., to provide wireless communication device 20a the predetermined result that wireless communication device 20 will assume is transmitted) or as an alternative to those solutions.

In particular embodiments, the information transmitted on the different protocol layer may represent information redundant to that transmitted on the downlink transmission. In this regard, redundant information may represent information with some overlap in informational content, such as an identical copy of the downlink transmission, a portion of the information transmitted in the downlink transmission, or the same information plus additional information (e.g., a superset of what was transmitted in the original downlink transmission.)

In alternative embodiments, the information transmitted on the different protocol layer may represent a pre-defined result (e.g., always "ACK," or "ACK" at specific indicated occasions) that may be used without e.g. decoding lower-layer signaling in the primary downlink transmission. In such embodiments, the transmission pattern for this higher-layer signaling may depend on the ABS configuration of the aggressor cell, a restricted measurement pattern of wireless communication device 20a, or both. In embodiments in which the higher-layer signaling provides pre-defined results, the higher-layer signaling may provide a pattern or parameters from which a pattern may be derived (e.g., periodicity, reference start time of the pattern, pattern length) for pre-defined results. At least some of the pattern parameters may be pre-defined, and/or the pre-defined results may be pre-defined and known without signaling (e.g., based on a rule).

For example, in particular embodiments, the lower-layer downlink transmission represents a PHICH, and likewise, the information signaled via higher-layer signaling comprises the UL HARQ feedback normally transmitted in DL in PHICH. An example, of a pre-defined result may be "ACK" or "NAK," to align with what would be expected on the control channel. Another example of a pre-defined result may be "always ACK" in specific time instances or in specific conditions. In other embodiments, the lower-layer downlink transmission may represent a broadcast channel and the information signaled via higher-layer signaling may represent system information. Yet another example is a data channel and SIB information.

In particular embodiments, wireless communication system 10 may be configured with an additional rule on the maximum number of times in which a pre-defined result may be provided, by low-power node 34a or used by wireless communication device 20 (e.g., a maximum number per UE measurement pattern or over a time interval), or a maximum number of consecutive times when the pre-defined result may be provided by low-power node 34a or wireless communication device 20a). The pre-defined result itself (e.g., UL HARQ feedback value) may likewise be determined by wireless communication device 20a autonomously (e.g., wireless communication device 20a attempts to figure out based, for example, on channel condition), determined according to a pre-defined rule or simply uniquely pre-defined (e.g., "ACK"), or explicitly indicated bv another node (e.g., "ACK" or "NAK"). The time instances when the pre-defined result is to be used may be obtained by wireless communication device 20a in different ways. For example, the time instances for using the pre-defined result may be determined by wireless communication device 20a autonomously, determined according to a pre-defined rule (e.g., interference condition, aggressor detection), or indicated by another node (e.g., by eNodeB or test equipment) via high-layer signaling or lower-layer signaling. Other conditions on when wireless communication device 20 may or shall use the pre-defined result (e.g., UL HARQ feedback) or when it may or shall not, may be determined, for example, by a pre-defined, rule (e.g., when wireless communication device 20a receives a measurement pattern or while the received measurement pattern is used by wireless communication device 20a), by a condition (e.g., when the signal quality is below a threshold), at a certain event (e.g., when performing random access), by an instruction received from another node (e.g., an indicator may be received from low-power node 34a indicating that wireless communication device 20a may or may not use pre-defined HARQ feedback; the indicator may be provided together with the pattern).

Thus, in particular embodiments, wireless communication system 10 may provide alternative mechanisms (e.g., pre-determined results, higher layer signaling) for a wireless communication device 20 to obtain information that is transmitted as part of a downlink transmission that will likely be unsuccessful because of inter-cell interference. These mechanisms allow wireless communication devices 20 to supplement or replace the information content of an erroneously received downlink transmission. Wireless communication system 10 may also provide for certain pre-defined, behavior for wireless communication devices 20 and radio access nodes to use in situations where an unsuccessful downlink transmission is likely because of inter-cell interference. This pre-defined behavior may conserve device resources (e.g., processing power), free up transmission resources in the victim cell, and provide more reliable and predictable operation in high interference situations. Thus, certain embodiments of wireless communication system 10 may provide numerous operational benefits. Nonetheless, specific individual embodiments of wireless communication system 10 may provide, some, none, or all of these benefits.

Figure 6:
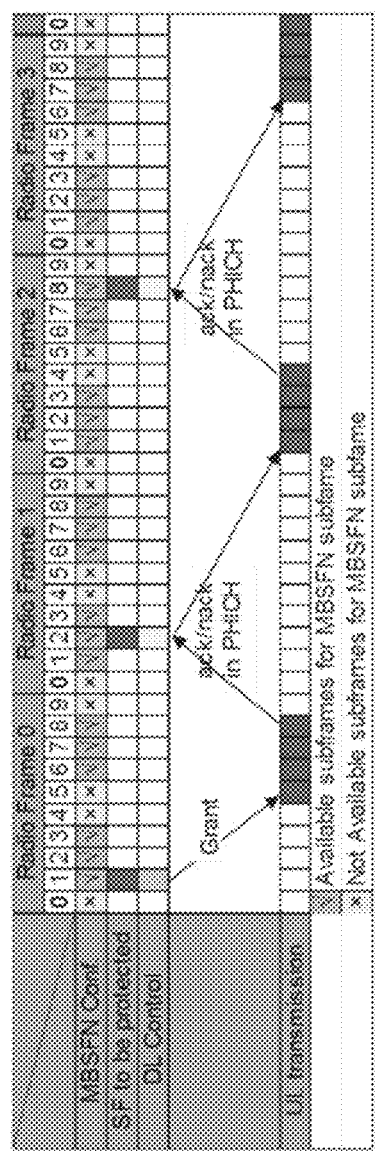
FIG. 6 illustrates the relative timing of downlink transmissions and candidate subframes in another scenario in which pre-defined results are used.

FIG. 6 illustrates the relative timing of downlink transmissions and candidate subframes in another example scenario in which pre-defined results are used by, for example, wireless communication device 20*a*. Like the example of FIG. 5, the example of FIG. 6 shows how an ABS configuration used in an aggressor cell, particularly an MBSFN ABS configuration, may not be able to protect all the subframes that might be needed for downlink transmissions in a victim cell. Thus, in the example of FIG. 6, a PHICH bitmap indicating pre-defined results is used by the relevant wireless communication device 20*a* to improve operation in situations in which successful reception of a downlink transmission would be unlikely.

In the illustrated example of FIG. 6, a first group of subframes comprising the pre-defined feasible subset of time- and/or frequency resources (or "candidate resources") for DL transmissions are those marked as "MBSFN conf." In particular embodiments, these subframes represent when the aggressor cell interference is low (e.g., as a result of the ABS being configured as MBSFN in the second network node). A second group of subframes comprising time occasions when PCHICH is transmitted are marked by "DL Control." In particular embodiments, these may be defined according to an appropriate standard specification (i.e., 3GPP TS 36.213). Moreover, in particular embodiments, this group may be defined by a timing constraint relative to a subframe in which an original uplink data transmission is scheduled. Additionally, the time occasions when the pre-defined information provided via higher-layer signaling shall or ma be utilized are marked as "PHICH bitmap."

In this example, subframes in which low-interference conditions are needed or desirable in the victim cell are marked as "SF to be Protected." In particular embodiments, these subframes correspond to the subframes included in a restricted measurement pattern configured for wireless communication device 20*a*.

The example scenario illustrated by FIG. 6 may include a UE in a CRE zone 52 or a UE, in general, for which a restricted measurement pattern is configured. As shown by FIG. 6, one example of the pre-defined information that may be provided to wireless communication device 20*a* on the higher-layer signaling is a bitmap that includes multiple bitmap indicators. Each bitmap indicator represents "0" or "1" value elements, where "0" may correspond, e.g., to an indication to wireless communication device 20*a* to follow a normal PHICH detection procedure, and "1" may correspond to an indication that wireless communication device 20*a* should assume a pre-defined information as the transmitted feedback value without attempting to detect the channel in this subframe. The pre-defined information may be associated with time- and/or frequency-resources that meet certain criteria, e.g., in a subframe where UL HARQ feedback is expected according to a predetermined rule. An example of pre-defined information that may be used is "HARQ ACK may be assumed in this subframe."

As shown in FIG. 6, in the (9,0) and (5,2) subframes "1" is set in the example PHICH bitmap. In the illustrated example, the "1" value associated with these subframes means that wireless communication device 20*a* shall always assume "ACK" is received in these subframes. In this example, the information will override the information transmitted in the corresponding PHICH channel. For example, even if the UL transmission in (5,0) is not successful, wireless communication device 20 assumes a predetermined value for the responsive DL feedback transmission in (9,0), because "1" is set in the PHICH bitmap. More specifically for this example, the predetermined values are all assumed to be set to a value of "ACK." Thus, "ACK" is assumed for the DL feedback transmission in (9,0) since "1" is set in the PHICH bitmap. In this example embodiment, wireless communication device 20*a* is configured not to flush its transmission buffer when initially receiving a positive hybrid-ARQ acknowledgement on PHICH for a given hybrid-ARQ process. Because of the assumed "ACK" value for the responsive DL feedback transmission that occurred or should have occurred in (9,0), no uplink retransmission happens in the (3,1) subframe.

In the (7,1) subframe, one uplink scheduling grant is sent by the network and received by wireless communication device 20*a* and the new-data indicator is not toggled for the grant. Since the new-data indicator is not toggled, wireless communication device 20*a* shall retransmit the pervious transport block in the (1, 2) subframe. If the transmission is not successful again, wireless communication device 20 may return to step 1 and 2 until the transport block for the DL transmission is successfully transmitted.

If, however, the transmission in subframe (5,0) is successful, wireless communication device 20*a* still assumes an "ACK" value for the DL feedback transmission (9,0) since "1" is set in the PHICH bitmap, UE shall not flush the transmission buffer when initially receiving a positive hybrid-ARQ acknowledgement on PHICH for a given hybrid-ARQ process. Because of the assumed "ACK" value for the responsive DL feedback transmission that occurred or should have occurred in (9,0), no uplink retransmission happens in the (3,1) subframe.

In the (7,1) subframe, one uplink scheduling grant is sent by low-power node 34*a* and received by wireless communication device 20*a* and the new-data indicator is toggled for the grant. Since the new-data indicator is toggled, the terminal shall transmit a new transport block and flush its transmission buffer.

The above procedure relies, in particular embodiments, on elements of a standard adaptive HARQ process. Particular embodiments of wireless communication system 10 support a HARQ process with signaling similar or identical to an adaptive HARQ process for certain subframes in which the DL feedback transmission (e.g., "ACK"/"NAK") cannot be detected reliably. Therefore, implementing the idea may have only a minimal impact on current standards. Thus, in particular embodiments, wireless communication device 20*a* may selectively utilize an adaptive HARQ process to create redundant information that can be used to supplement or replace transmissions that are required to occur in subframes that are not interference protected by the ABS configuration of the aggressor cell.

Figure 7:
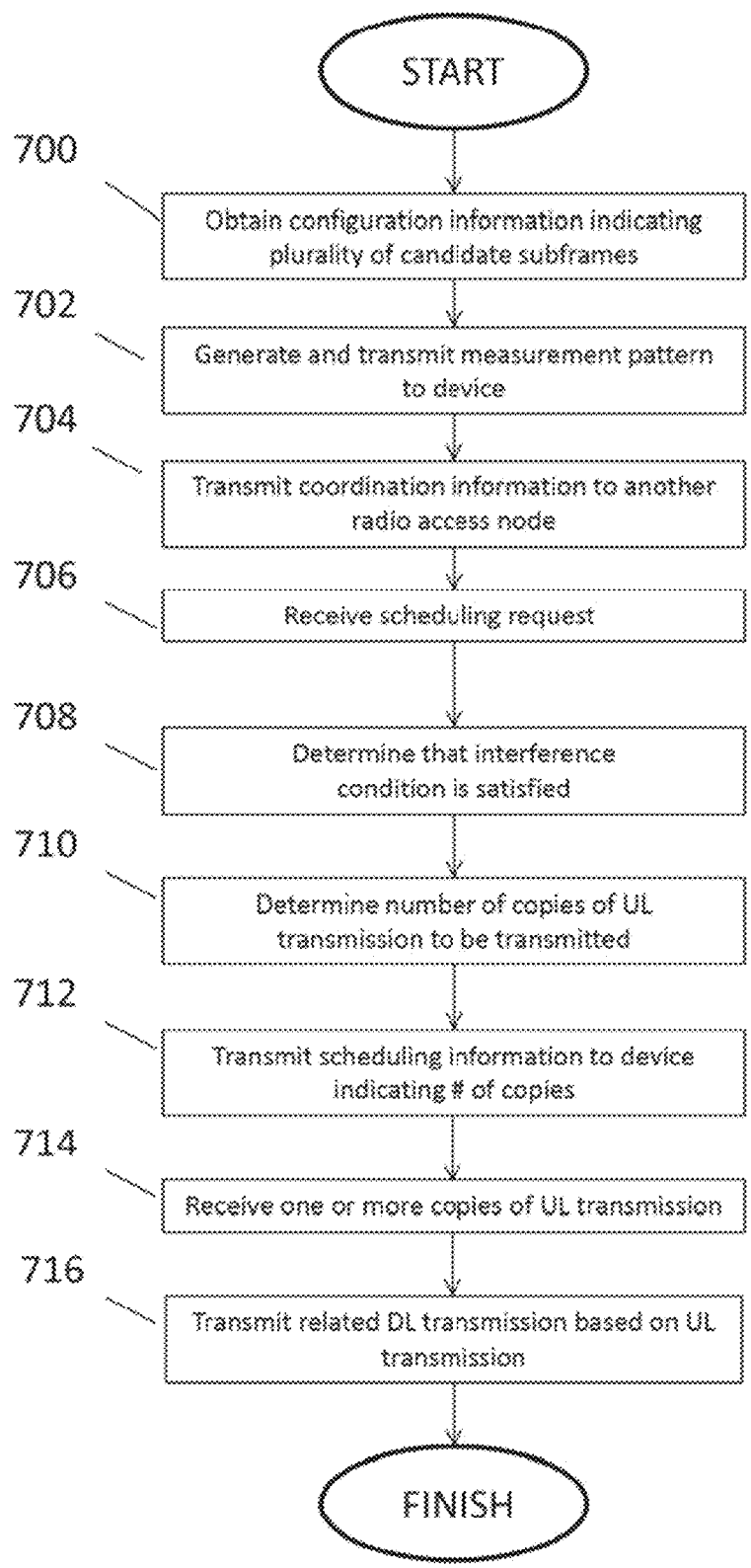
FIG. 7 is a flow chart illustrating example operation for a particular embodiment of a wireless communication device in responding to inter-cell interference.

FIG. 7 is a flow chart illustrating example operation for a particular embodiment of a wireless communication device 20 in responding to inter-cell interference. More specifically, FIG. 7 illustrates example operation for an embodiment in which the relevant wireless communication device 20 (here, once again, wireless communication device 20*a* of FIG. 1A) is capable of implementing certain pre-defined behavior in response to determining that a downlink transmission (e.g., a downlink feedback transmission, such as a transmission of HARQ feedback on PHICH) will occur or is scheduled to occur in a subframe that is not a candidate subframe.

Operation in FIG. 7 begins with wireless communication device 20*a* obtaining information indicating a set of candidate subframes for downlink transmissions in a victim cell a step 700. These candidate subframes may represent subframes in which transmissions b) base station 32*a* in the aggressor cell are limited in some way (e.g., the subframes configured as ABS subframes under the ABS configuration), subframes that low-power node 34*a* or access network 30 has designated as being acceptable for certain or all interference sensitive operations (e.g., the subframes identified by a restricted measurement pattern configured for wireless communication device 20*a*), or some combination of the two. Furthermore, in particular embodiments, subframes included in any restricted measurement patterns configured for wireless communication devices 20 in the victim cell represent subsets of the subframes protected by the ABS configuration for the aggressor cell. In this example, the obtained information indicates a plurality of candidate subframes that satisfy a predetermined candidate condition pertaining to transmissions in the aggressor cell. For instance, the obtained information may indicate an MBSFN ABS configuration used by the aggressor cell.

Additionally, in particular embodiments, wireless communication device 20 may limit its use of the described techniques to situations in which the circumstances require more drastic measures (e.g., for dealing with interference caused by the aggressor cell). As a result, in the illustrated example, wireless communication device 20*a* determines, at step 702, whether a triggering condition is satisfied before possibly using the pre-defined behavior. As explained above, the triggering condition may relate to any suitable consideration pertaining to the use of pre-defined behavior by wireless communication device 20. Examples of the triggering, condition include, but are not limited to, whether wireless communication device 20*a* experiences high interference levels, has detected or been notified of an aggressor cell or high interference levels, is operating in a CRE zone, is experiencing a channel quality strongly suggesting one feedback result or the other, has received higher-layer signaling indicating what the assumed result should be, receives the downlink transmissions at certain specified times in a particular subframe, has had a maximum number of retransmissions that exceeds a threshold number. If the triggering condition is not satisfied, wireless communication device 20 may instead attempt to receive the relevant downlink transmission despite it not being transmitted in one of the candidate subframes and operation may proceed to step 712. Otherwise, operation proceeds to step 704.

In the example embodiment of FIG. 7, the relevant downlink transmissions represent, for purposes of example, feedback information indicating whether an uplink transmission made by wireless communication device 20*a* was successfully received by low-power node 34*a*. As a result, in such embodiments, the relevant downlink transmissions may be triggered by uplink transmissions made by wireless communication device 20*a*. Thus, in the illustrated example, wireless communication device 20*a* transmits an uplink data transmission at step 704.

To determine whether downlink transmissions intended for wireless communication device 20*a* will occur during a candidate subframe, wireless communication device 20*a* may need to determine a subframe associated with a downlink transmission that is intended for wireless communication device 20. In the illustrated example, a downlink feedback transmission responsive to the uplink data transmission transmitted by wireless communication device 20*a* may have, a fixed timing relationship with the uplink transmission, and wireless communication device 20*a* may be able to identify the subframe in which the corresponding, downlink feedback transmission will occur based on the subframe in which wireless communication device 20*a* transmitted its uplink transmission (e.g., the subframe occurring four subframes later).

As a result, at step 706, wireless communication device 20*a* identifies a subframe associated with a responsive downlink feedback transmission based on the fixed timing relationship between the uplink data transmission and its responsive downlink feedback transmission. The subframe associated with the responsive downlink feedback transmission may represent the subframe during which the downlink feedback transmission is scheduled or required to occur (e.g., based on the parameters of the feedback scheme being used), the subframe in which the downlink feedback transmission would occur if it were transmitted (e.g., in situations in which low-power node 34*a* decides not to transmit the downlink transmission), or a subframe associated in any other suitable manner with a downlink transmission intended for wireless communication device 20*a*. For example, in embodiments implementing the synchronous HARQ scheme shown in FIG. 4 with the downlink feedback transmission, if transmitted, will occur four frames after the uplink transmission. In such embodiments, once the uplink data transmission by wireless communication device 20*a* has been scheduled, wireless communication device 20*a* may be able to identify a subframe associated with a responsive feedback transmission by adding 4 subframes to the subframe in which the uplink transmission is scheduled.

After identifying a subframe associated with a downlink transmission intended for wireless communication device 20*a*, wireless communication device 20*a* then determines whether the identified subframe is included in the set of candidate subframes, at step 708. In certain embodiments, if the identified subframe is included in the set of candidate subframes, this means that the identified subframe will be sufficiently protected from interference by an ABS configuration used by the aggressor cell (e.g., the identified subframe is identified as an MBSFN subframe in the aggressor cell). Thus, in the illustrated example, if the identified subframe is included in the set of candidate subframes, wireless communication device 20*a* may attempt to receive the downlink transmission associated with the identified subframe, at step 712.

In certain embodiments, if the identified subframe is not included in the set of candidate subframes, this means that the identified subframe is not protected from inter-cell interference caused by the aggressor cell, and successful receipt of the corresponding downlink transmission during the identified subframe is unlikely to occur. Thus, in such embodiments, wireless communication device 20*a* may perform one or more pre-defined operations. Examples of these pre-defined operations may include assuming no downlink transmission will, occur in the identified subframe, deciding not to receive a downlink transmission in the identified subframe, assuming a pre-defined result for a downlink transmission received in the identified subframe, and any suitable combination of these operations.

For instance in the illustrated embodiment, the pre-defined operations performed by wireless communication device 20*a* include both deciding not to receive a downlink transmission in the identified subframe and assuming a pre-defined result for a downlink transmission received in the identified subfraine. Thus, at step 710, wireless communication device 20*a* decides not to receive a downlink transmission in the identified subframe. As explained above, in particular embodiments, wireless communication device 20*a* may not have any control over whether the signal associated with the transmission strikes its antenna. However, "deciding not to receive" the signal may involve deciding not to activate a receiver circuit, deciding to discard the incident signal, deciding not to decode the signal, deciding not to demodulate the signal, and/or deciding not to perform any additional processing or operation that is normally performed by wireless communication device 20a as part of receiving a signal.

Additionally, in the illustrated example, wireless communication device 20a also assumes a pre-defined result for a downlink transmission received in the identified subframe at step 714. For example, in particular embodiments, the downlink transmission represents a downlink feedback transmission indicating the success or failure of a corresponding uplink transmission. In such embodiments, wireless communication device 20 may assume a successful reception of the downlink feedback transmission would have yielded a result of for example, "ACK." Wireless communication device 20a may be configured to always make the same assumption (e.g., always "ACK"), to make different assumptions at specific indicated occasions (e.g., "ACK" during Subframes #4 and #5), or to make different assumptions based on specific indicated conditions (e.g., "NAK" when located in a CRE zone and "ACK" otherwise). Wireless communication device 20a may then continue with its operation treating the assumed result as if it were the value indicated by the downlink transmission. For example, if the assumed pre-defined result is "ACK," wireless communication device 20a may decide not to transmit as retransmission of the uplink data transmission. Operation of wireless communication device 20a in regards to this particular downlink transmission or set of downlink transmissions may then end as shown in FIG. 7.

Figure 8:
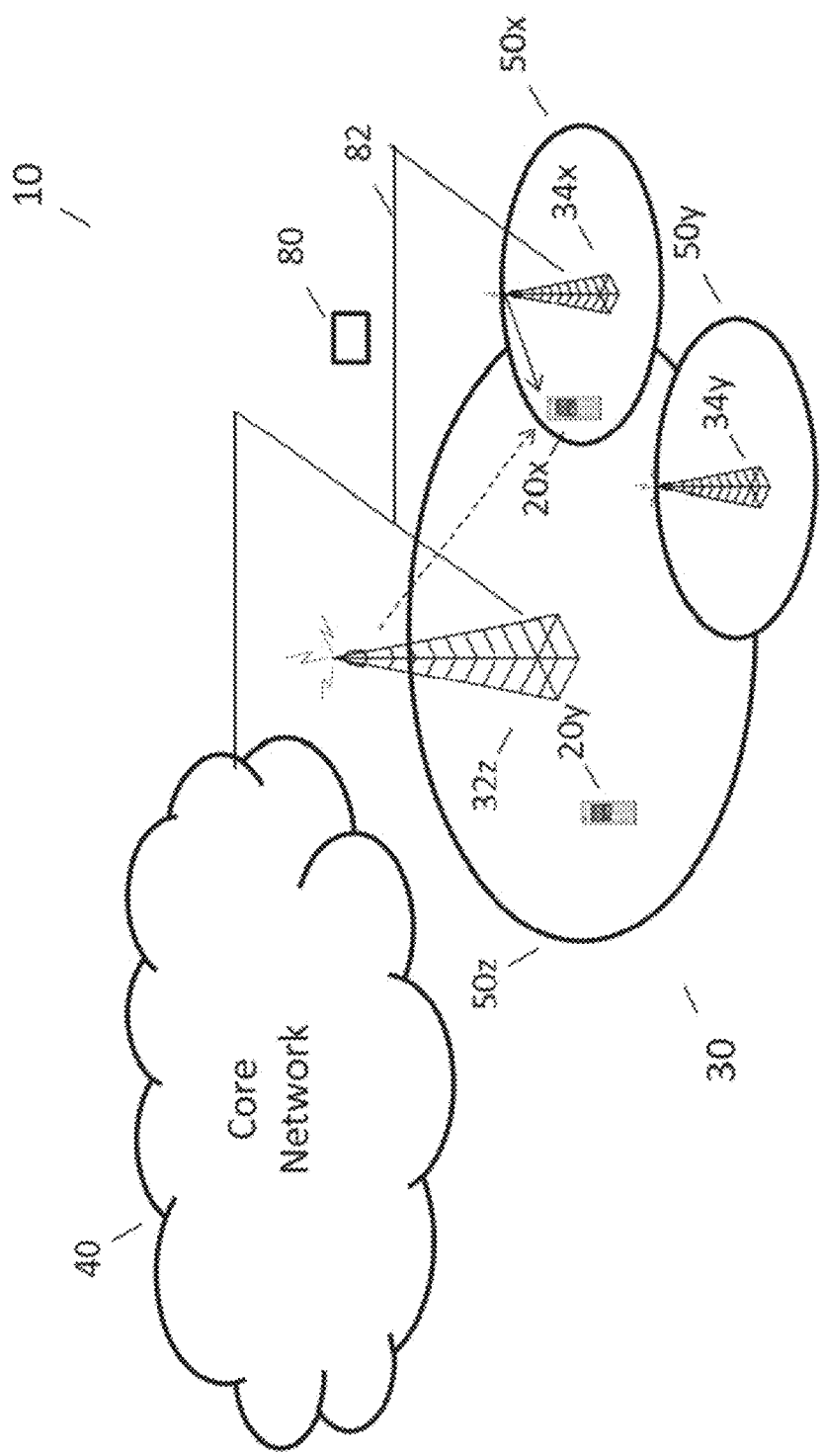
FIG. 8 is a flow chart illustrating example operation for a particular embodiment of a radio access node in responding to inter-cell interference.

FIG. 8 is a flow chart illustrating example operation for a particular embodiment of a radio access node in responding to inter-cell interference. More specifically, FIG. 8 illustrates example operation for an embodiment in which the relevant radio access node is capable of implementing certain pre-defined behavior in response to determining that a downlink transmission (e.g., a downlink feedback transmission, such as a transmission of HARQ feedback on PHICH) will occur or is scheduled to occur in a subframe that is not a candidate subframe.

Operation begins in FIG. 8 with a radio access node (in this example, low-power node 34a of FIG. 1A) obtaining information indicating a first set of candidate subframes for downlink transmissions in a victim cell at step 800. Steps 800 and 802 occur in a similar or identical fashion to that disused above with respect to steps 700 and 702 of FIG. 7.

In the example embodiment of FIG. 8, the relevant downlink transmissions again represent feedback information indicating whether an uplink transmission made by wireless communication device 20a was successfully received by low-power node 34a. Thus, in the illustrated example, low-power node 34a receives an uplink data transmission from wireless communication device 20a at step 804. In response to the received uplink data transmission, low-power node 34a generates feedback information indicating whether low-power node 34a successfully received the uplink data transmission.

As explained, above, a fixed timing relationship may exist between the uplink data transmission and the responsive downlink feedback transmission, such that the downlink feedback transmission is transmitted a fixed, predetermined number of subframes after the uplink data transmission. However, if the downlink feedback transmission would occur in a subframe during which it is unlikely that wireless communication device 20a would receive the downlink transmission then, under certain circumstances, low-power node 34a may decide not to transmit the subframe and/or implement other types of pre-defined behavior. Steps 806-812 and 816-818 illustrate an example of this process.

At step 806, low-power node 34a determines whether wireless communication device 20a is also engaged in pre-defined behavior. Low-power node 34a may determine this based on capability information received from wireless communication device 20a, based on a configuration set for wireless communication device 20a, and/or on any other consideration. In particular embodiments, confirming wireless communication device 20a is also engaged in pre-defined behavior may help ensure wireless communication device 20a reacts predictably and to the same factors that low-power node 34 does. If wireless communication device 20a is using pre-defined behavior, low-power node 34a may also engage in pre-defined behavior. If wireless communication device 20 is not using pre-defined behavior, low-power node 34a elects not to either and operation may advance to step 814 with low-power node 34 transmitting, the relevant downlink transmission in the designated subframe.

At step 808, low-power node 34a identifies a subframe during which low-power node 34a will transmit a downlink transmission to wireless communication device 20a. As noted above, this may be determined based on the subframe in which a corresponding uplink transmission was transmitted. At step 810, low-power node 34a determines whether the identified subframe is included in the set of candidate subframes. If the identified subframe is included in the set of candidate subframes, low-power node 34a may determine at step 812 whether the identified subframe comprises a time period during which wireless communication device 20a would not be expected to receive a downlink transmission for some other reason. If not, operation may proceed to step 814 with low-power node 34 transmitting the relevant downlink transmission in the designated subframe.

In the illustrated example, if the identified subframe is not included in the set of candidate subframes or if another reason exists why the identified subframe comprises a time period during which wireless communication device 20 would not be expected to receive a downlink transmission, low-power node 34 may decide not to transmit the relevant downlink transmission at step 816. Additionally, in the illustrated example, low-power node 34a may be configured to make "assumptions" regarding the information transmitted during the identified subframe using the same pre-defined rule(s) as wireless communication device 20a. Thus, at step 818, low-power node 34a assumes a pre-defined result was transmitted for the downlink transmission associated with the identified subframe. Operation of wireless communication device 20a in regards to this particular downlink transmission or set of downlink transmissions may then end as shown in FIG. 8.

Figure 9:
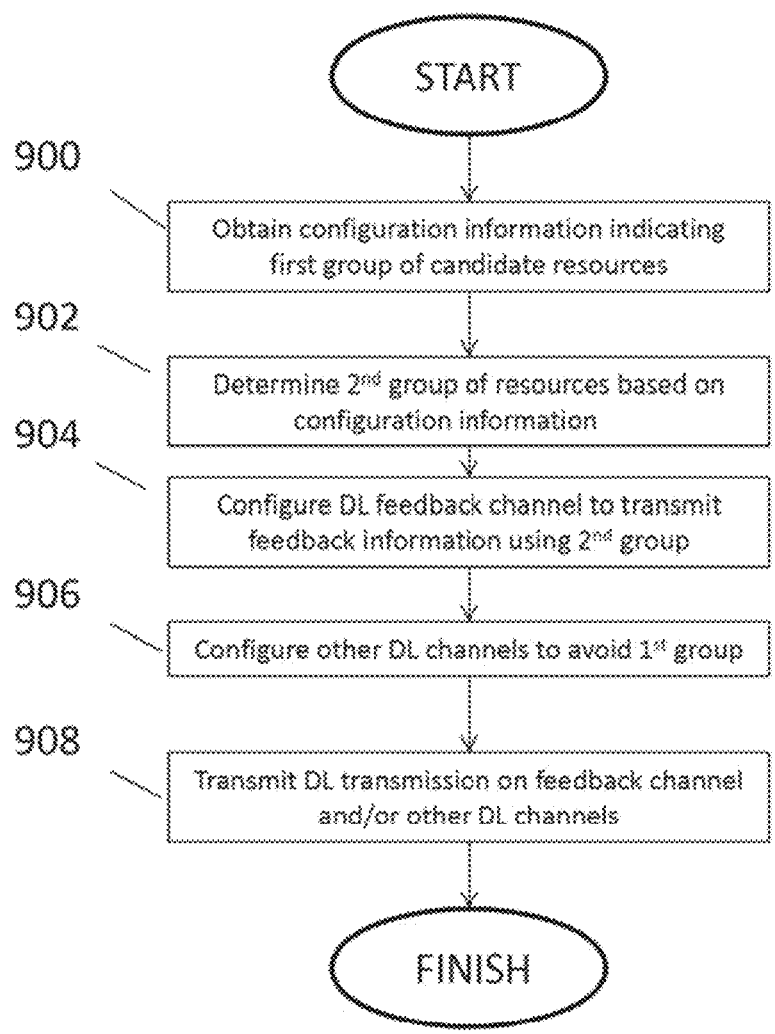
FIG. 9 is a block diagram illustrating a particular embodiment of a wireless communication device.

FIG. 9 is a block diagram illustrating in greater detail the contents of a particular embodiment of a wireless communication device 20 that may be configured to rely on pre-defined behavior in receiving and/or processing downlink transmissions from a serving radio access node under high-interference conditions. As shown in FIG. 9, the example embodiment of wireless communication device 20 includes a device processor 902, a device memory 904, an antenna 906, a transmitter 908, and a receiver 910.

Device processor 902 may represent or include any form of processing component, including dedicated microprocessors, general-purpose computers, or other forms of electronic circuitry capable of processing electronic information. Examples of device processor 902 include field-programmable gate arrays (FPGAs), programmable microprocessors, digital signal processors (DSPs), application-specific integrated circuits (ASICs), and any other suitable specific- or general-purpose processors. Although FIG. 9 illustrates, for the sake of simplicity, an embodiment of wireless communication device 20 that includes a single device processor 902, wireless communication device 20 may include any number of device processors 902 configured to interoperate in any appropriate manner.

Device memory 904 stores configuration information obtained by wireless communication device 20, such as an indication of a transmission pattern used in a potential aggressor cell, a restricted measurement pattern used by wireless communication device 20, DRX/DTX settings, or any other configuration information used by wireless communication device 20. Additionally, device memory 904 may also store processor instructions for device processor 902, coding algorithms, transmission parameters, and/or any other data utilized by wireless communication device 20 during operation. Device memory 904 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 9, device memory 904 may include one or more physical components local to or remote from wireless communication device 20.

Antenna 906 represents any suitable conductor capable of receiving and transmitting wireless signals. Transmitter 908 transmits radiofrequency (RF) signals over antenna 906, and receiver 910 receives from antenna 906 RE certain signals transmitted by access network 30. Although the example embodiment in FIG. 9 includes certain numbers and configurations of antennas, receivers, and transmitters, alternative embodiments of wireless communication device 20 may include any suitable number of these components. Additionally, transmitter 908, receiver 910, and/or antenna 906 may represent, in part or in whole, the same physical components. For example, particular embodiments of wireless communication device 20 include a transceiver representing both transmitter 908 and receiver 910.

Figure 10:
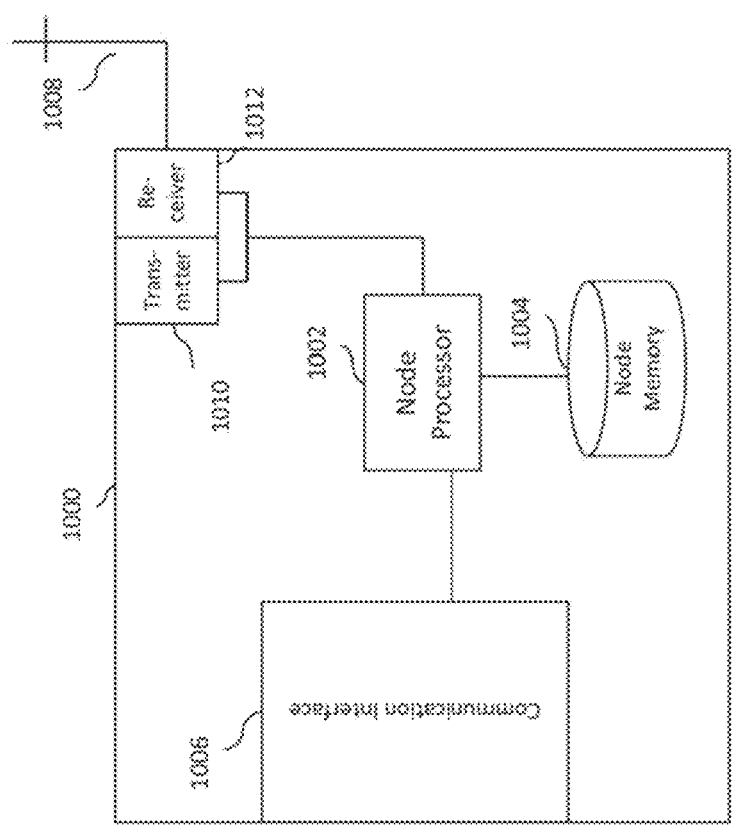
FIG. 10 is a block diagram illustrating a particular embodiment of a radio access node.

FIG. 10 is a block diagram illustrating in greater detail the contents of a particular embodiment of a radio access node 1000 that may be configured to rely on pre-defined behavior in transmitting downlink transmissions to a wireless communication device 20 and otherwise interacting with the wireless communication device 20 under high-interference conditions. As shown in FIG. 10, the example embodiment of network node 1000 includes a node processor 1002, a node memory 1004, a communication interface 1006, an antenna 1008, a transmitter 1010, and a receiver 1012.

Node processor 1002 may represent or include any form of processing component, including dedicated microprocessors, general-purpose computers, or other forms of electronic circuitry capable of processing electronic information. Examples of node processor 1002 include field-programmable gate arrays (FPGAs), programmable microprocessors, digital signal processors (DSPs), application-specific integrated circuits (ASICs), and any other suitable specific- or general-purpose processors. Although FIG. 10 illustrates, for the sake of simplicity, an embodiment of network node 1000 that includes a single node processor 1002, network node 1000 may include any number of node processors 1002 configured to intemperate in any appropriate manner.

Node memory 1004 stores configuration information obtained by radio access node 1000, such as an indication of a selected feedback scheme, coordination information received from other radio access nodes, DRX/DTX settings for served wireless communication devices 20, or any other configuration information used by radio access node 1000. Node memory 1004 may also store processor instructions for node processor 1002, coding algorithms, transmission parameters, and/or any other data utilized by radio access node 1000 during operation. Node memory 1004 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 10, node memory 1004 may include one or more physical components local to or remote from radio access node 1000.

Communication interface 1006 comprises electronic, circuitry and other components suitable to permit radio access node 1000 to communicate with other radio access nodes and/or other elements of access network 30 and core network 40. For example, in embodiments in which radio access node 1000 exchanges coordination information with other network nodes in access network 30, communication interface 1006 may represent circuitry capable of communicating over an X2 interface between radio access node 1000 and other nodes of access network 30.

Antenna 1008 represents any suitable conductor capable of receiving and transmitting wireless signals. Transmitter 1010 transmits radiofrequency (RF) signals over antenna 1008, and receiver 1012 receives from antenna 1008 RF certain signals transmitted by wireless communication devices 20. Although the example embodiment in FIG. 10 includes certain numbers and configurations of antennas, receivers, and transmitters, alternative embodiments of radio access node 1000 may include any suitable number of these components. Additionally, transmitter 1010, receiver 1012, and/or antenna 1008 may represent, in part or in whole, the same physical components. For example, particular embodiments of radio access node 1000 include a transceiver representing both transmitter 1010 and receiver 1012.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method in a wireless communication device for receiving feedback on uplink transmissions, the method comprising:
    obtaining information indicating a first set of candidate subframes for downlink transmissions in a first cell wherein each candidate subframe comprises a subframe which satisfies a predetermined candidate condition that relates to transmissions in a second cell during that subframe;
    identifying at least one subframe associated with downlink transmissions of feedback information to the wireless communication device in the first cell;
    if the identified subframe is one of the candidate subframes, receiving at least one downlink transmission of feedback information during the identified subframe; and if the identified subframe is not one of the candidate subframes, performing one or more of:
  assuming no downlink transmission of feedback information in the identified subframe;
  deciding to not receive downlink transmission of feedback information in the identified subframe; and
  assuming a pre-defined result for the downlink transmission of feedback information received in the identified subframe.

2. The method of claim 1, further comprising receiving the information transmitted in said downlink transmission via a separate transmission transmitted on a higher layer than the downlink transmission was transmitted.

3. The method of claim 1, wherein the downlink transmission comprises feedback information regarding an uplink transmission, and further comprising:
  receiving result information identifying the pre-defined result prior to transmitting the uplink transmission; and
  transmitting the uplink transmission.

4. The method of claim 3, wherein the result information identifies a value indicating that the uplink transmission was successfully received as the pre-defined result.

5. The method of claim 3, further comprising:
  deciding whether the pre-defined result indicates that the uplink transmission was successfully received;
  in response to deciding that the pre-defined result indicates the uplink transmission was successfully received, refraining from retransmitting the uplink transmission in a next retransmission opportunity;
  receiving a scheduling grant having a new data indicator that is not toggled, wherein the scheduling grant schedules a transmission in a subsequent retransmission opportunity; and
  in response to receiving the scheduling grant having a new data indicator that is not toggled, retransmitting the uplink transmission in the subsequent retransmission opportunity.

6. The method of claim 1, wherein the information indicating a plurality of candidate subframes comprises a bitmap that includes a bit corresponding to each of a plurality of subframes, wherein the bit corresponding to each subframe indicates whether a result associated with that subframe should be determined based on received feedback information or a predetermined rule.

7. The method of claim 1, wherein the candidate subframes comprise subframes in which a second cell is configured to use Multicast and Broadcast Single Frequency Network (MBSFN) Almost Blank Subframes (ABS).

8. The method of claim 7, wherein the triggering condition relates to an interference measurement performed by the first network node or the wireless communication device.

9. The method of claim 7, wherein the triggering condition relates to whether the wireless communication device is located within a cell of a second network node that serves a closed subscriber group to which the wireless communication device does not belong.

10. The method of claim 7, wherein the triggering condition relates to whether the wireless communication device is operating within a cell range expansion zone of the first network node.

11. The method of claim 7, wherein the triggering condition relates to a number of retransmissions made by the wireless communication device.

12. The method of claim 1, further comprising determining whether a triggering condition is satisfied.

13. The method of claim 1, wherein the candidate condition relates to an ability of the wireless communication device to handle high interference or a type of receiver associated with the wireless communication device.

14. An apparatus for wireless communication, the apparatus comprising:
  a transmitter configured to transmit uplink transmissions;
  a receiver configured to receive feedback information associated with the uplink transmissions; and
  a processor configured to:
    obtain information indicating a first set of candidate subframes for downlink transmissions in a first cell wherein each candidate subframe comprises a subframe which satisfies a predetermined candidate condition that relates to transmissions in a second cell during that subframe;
    identify at least one subframe associated with downlink transmissions of feedback information to the apparatus in the first cell;
    if the identified subframe is one of the candidate subframes, receive at least one downlink transmission of feedback information during the identified subframe; and
    if the identified subframe is not one of the candidate subframes, perform one or more of:
      assuming no downlink transmission of feedback information in the identified subframe;
      deciding to not receive downlink transmission of feedback information in the identified subframe; and
      assuming a pre-defined result for the downlink transmission of feedback information received in the identified subframe.

15. The apparatus of claim 14, wherein the receiver is further configured to receive the information transmitted in said downlink transmission via a separate transmission on a higher layer than the downlink transmission was transmitted.

16. The apparatus of claim 14, wherein the downlink transmission comprises feedback information regarding an uplink transmission, and wherein the processor is further operable to:
  receive result information via the receiver prior to transmitting the uplink transmission, wherein the result information identifies the pre-defined result; and
  transmit the uplink transmission using the transmitter.

17. The apparatus of claim 16, wherein the result information identifies a value indicating that the uplink transmission was successfully received as the pre-defined result.

18. The apparatus of claim 16, wherein the processor is further configured to:
  decide whether the pre-defined result indicates that the uplink transmission was successfully received;
  in response to deciding that the pre-defined result indicates the uplink transmission was successfully received, refrain from retransmitting the uplink transmission in a next retransmission opportunity;
  receive a scheduling grant having a new data indicator that is not toggled, wherein the scheduling grant schedules a transmission in a subsequent retransmission opportunity; and
  in response to receiving the scheduling grant having a new data indicator that is not toggled, retransmit the uplink transmission in the subsequent retransmission opportunity.

19. The apparatus of claim 14, wherein the information indicating a plurality of candidate subframes comprises a bitmap that includes a bit corresponding to each of a plurality of subframes, wherein the bit corresponding to each subframe indicates whether a result associated with that subframe should be determined based on received feedback information or a predetermined rule.

20. The apparatus of claim 14, wherein the candidate subframes comprise subframes in which a second cell is configured to use Multicast and Broadcast Single Frequency Network (MBSFN) Almost Blank Subframes (ABS).

21. The apparatus of claim 14, wherein the processor is further configured to determine whether an triggering condition is satisfied, the triggering condition relating to an amount of interference experienced by the apparatus.

22. The apparatus of claim 21, wherein the triggering condition relates to an interference measurement performed by the first network node or the apparatus.

23. The apparatus of claim 21, wherein the triggering condition relates to whether the apparatus is located within a cell of a second network node that serves a closed subscriber group to which the apparatus does not belong.

24. The apparatus of claim 21, wherein the triggering condition relates to whether the apparatus is operating within a cell range expansion zone of the first network node.

25. The apparatus of claim 21, wherein the triggering condition relates to a number of retransmissions made by the apparatus.

26. The apparatus of claim 14, wherein the candidate condition relates to an ability of the apparatus to handle high interference or a type of receiver associated with the apparatus.

27. A method of managing inter-cell interference in a wireless communication device, the method comprising:
 obtaining information indicating a first set of candidate subframes, wherein each candidate subframe comprises a subframe which satisfies a predetermined candidate condition that relates to transmissions in a second cell during that subframe;
 identifying at least one subframe associated with downlink transmissions of feedback information to a first wireless communication device that is served by the radio access node;
 determining whether the identified subframe is included in the set of candidate subframes;
 if the identified subframe is included in the set of candidate subframes, transmitting a downlink transmission of feedback information during the identified subframe; and
 if the identified subframe is not included in the set of candidate subframes, performing one or more of:
  deciding to not transmit the downlink transmission of feedback information associated with the identified subframe during the identified subframe;
  assuming a pre-defined result has been transmitted for the downlink transmission of feedback information associated with the identified subframe.

28. The method of claim 27, further comprising determining whether a triggering condition is satisfied.

29. The method of claim 28, wherein the triggering condition relates to an interference measurement performed by the first network node or the wireless communication device.

30. The method of claim 28, wherein the triggering condition relates to whether the wireless communication device is located within a cell of a second network node that serves a closed subscriber group to which the wireless communication device does not belong.

31. The method of claim 28, wherein the triggering condition relates to whether the wireless communication device is operating within a cell range expansion zone of the first network node.

32. The method of claim 28, wherein the triggering condition relates to a number of retransmissions made by the wireless communication device.

33. An apparatus for wireless communication, the apparatus comprising:
 a transmitter configured to transmit information wirelessly to a wireless communication device;
 a receiver configured to receive information transmitted wirelessly by a wireless communication device; and
 a processor configured to:
  obtain information indicating a first set of candidate subframes, wherein each candidate subframe comprises a subframe which satisfies a predetermined candidate condition that relates to transmissions in a second cell during that subframe;
  identify at least one subframe associated with downlink transmissions of feedback information to a first wireless communication device that is served by the apparatus;
  determine whether the identified subframe is included in the set of candidate subframes;
  if the identified subframe is included in the set of candidate subframes, transmit a downlink transmission of feedback information during the identified subframe; and
  if the identified subframe is not included in the set of candidate subframes, perform one or more of:
   deciding not to transmit the downlink transmission of feedback information associated with the identified subframe during the identified subframe;
   assuming a pre-defined result has been transmitted for the downlink transmission of feedback information associated with the identified subframe.

34. The apparatus of claim 33, wherein the processor is further configures to determine whether a triggering condition is satisfied.

35. The apparatus of claim 34, wherein the triggering condition relates to an interference measurement performed by the apparatus or the wireless communication device.

36. The apparatus of claim 34, wherein the triggering condition relates to whether the wireless communication device is located within a cell of a network node that serves a closed subscriber group to which the wireless communication device does not belong.

37. The apparatus of claim 34, wherein the triggering condition relates to whether the wireless communication device is operating within a cell range expansion zone of the apparatus.

38. The apparatus of claim 34, wherein the triggering condition relates to a number of retransmissions made by the wireless communication device.

* * * * *